United States Patent
Mitsuhashi et al.

(10) Patent No.: US 8,574,763 B2
(45) Date of Patent: Nov. 5, 2013

(54) ELECTRODE PLATE WITH A BINDER IN A SURFACE SECTION WITH A LOWER GLASS TRANSITION POINT THAN A BINDER IN A CURRENT COLLECTOR PLATE SECTION, SECONDARY BATTERY, AND METHOD FOR PRODUCING THE ELECTRODE PLATE

(75) Inventors: Toshihiko Mitsuhashi, Toyota (JP); Koji Takahata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/266,827

(22) PCT Filed: Oct. 13, 2010

(86) PCT No.: PCT/JP2010/067971
§ 371 (c)(1),
(2), (4) Date: Oct. 28, 2011

(87) PCT Pub. No.: WO2012/049746
PCT Pub. Date: Apr. 19, 2012

(65) Prior Publication Data
US 2012/0177990 A1  Jul. 12, 2012

(51) Int. Cl.
*H01M 4/02* (2006.01)
*H01M 4/13* (2010.01)
*H01M 4/60* (2006.01)
*H01M 4/62* (2006.01)
*H01M 4/82* (2006.01)
*H01M 6/00* (2006.01)
*B05D 5/12* (2006.01)

(52) U.S. Cl.
USPC ............ 429/217; 429/209; 429/212; 427/58; 29/623.1; 29/623.5

(58) Field of Classification Search
USPC ................... 429/211, 209, 212, 217; 427/58; 29/623.1, 623.5
See application file for complete search history.

(56) References Cited

U.S. PATENT DOCUMENTS

| 2003/0087152 A1* | 5/2003 | Shindo et al. ................. 429/217 |
| 2003/0113626 A1 | 6/2003 | Maeda et al. |
| 2009/0191460 A1 | 7/2009 | Fujiwara et al. |

FOREIGN PATENT DOCUMENTS

| JP | 9-134718 | 5/1997 |
| JP | 2001-345096 | 12/2001 |

(Continued)

OTHER PUBLICATIONS

Ichikawa, T., Machine translation of JP 2010-182626 A, Aug. 2010.*

(Continued)

*Primary Examiner* — Sean P Cullen
(74) *Attorney, Agent, or Firm* — Finnegan, Henderson, Farabow, Garrett & Dunner, LLP

(57) ABSTRACT

An electrode plate includes a current collector plate and an active material layer formed thereon. The active material layer includes, as a binder, a plurality of binders having different glass transition points (Tg) from each other. A ratio (A2/A1) between the amount of a binder contained in a surface section and the amount of a binder contained in a current collector plate section is 1.0 to 1.2. Further, an average glass transition point (Tgu) of the binder in the surface section is lower than an average glass transition point (Tgd) of the binder in the current collector plate section (Tgu<Tgd).

16 Claims, 15 Drawing Sheets

(56) References Cited

FOREIGN PATENT DOCUMENTS

| JP | 2003-151556 | | 5/2003 |
|---|---|---|---|
| JP | 2005-166756 | | 6/2006 |
| JP | 2009-206079 | | 9/2009 |
| JP | 2010182626 A | * | 8/2010 |
| WO | WO 98/39808 | | 9/1998 |
| WO | WO 2009/087731 A1 | | 7/2009 |
| WO | WO 2009112920 A1 | * | 9/2009 |

OTHER PUBLICATIONS

Written Opinion of the International Searching Authority in International Application No. PCT/JP2010/067971; Mailing Date: Dec. 7, 2010.

* cited by examiner

EX: Example    CEX: Comparative Example

ELECTRODE PLATE WITH A BINDER IN A SURFACE SECTION WITH A LOWER GLASS TRANSITION POINT THAN A BINDER IN A CURRENT COLLECTOR PLATE SECTION, SECONDARY BATTERY, AND METHOD FOR PRODUCING THE ELECTRODE PLATE

CROSS-REFERENCE TO RELATED APPLICATIONS

This application is a national phase application of International Application No. PCT/JP2010/067971, filed Oct. 13, 2010, the contents of which are incorporated herein by reference.

TECHNICAL FIELD

The present invention relates to an electrode plate with an active material layer containing at least an active material and a binder formed on a current collector plate. It also relates to a secondary battery having this electrode plate. The invention also relates to a method for producing this electrode plate.

BACKGROUND ART

Conventionally, electrode plates for secondary batteries are known, which include a current collector plate and an active material layer formed thereon and containing at least an active material and a binder. For example, one positive electrode includes a current collector plate made of aluminum foil and a positive active material layer formed thereon and containing a positive active material such as lithium metal oxide and a binder such as polyvinylidene fluoride (PVDF), styrene-butadiene rubber (SBR). One negative electrode, for example, includes a current collector plate made of copper foil and a negative active material layer formed thereon and containing a negative active material made of a carbon material and a binder such as PVDF, SBR.

Typically, an active material layer is formed by applying an active material paste prepared through dispersion of active material, binder, and the like in a solvent on a current collector plate, followed by drying of the coated film of this active material paste. However, as the coated film is dried, the binder migrates toward the surface of the coated film with the solvent as the solvent vaporizes from the surface of the coated film. Because of this, the active material layer after the drying step tends to contain more binder on the surface side and less binder on the current collector plate side when viewed in the thickness direction. An electrode plate with such an uneven distribution of binder is prone to a problem of lowered bond strength between the active material layer and the current collector plate.

As one countermeasure, Patent Document 1 proposes alternately repeating a coating step of applying an electrode coating liquid (active material paste) made of active material and binder mixed together on a conductive current collector plate and a drying step of drying the electrode coating liquid applied on the plate several times each to form an active material layer (see claims, etc. of Patent Document 1). It is taught that, by this method, the distribution of binder in the active material layer can be made less uneven.

RELATED ART DOCUMENTS

Patent Documents

Patent Document 1: JP9 (1997)-134718A

DISCLOSURE OF THE INVENTION

Problems to be Solved by the Invention

However, the problem of lowered bond strength between the active material layer and the current collector plate can still occur even in the electrode plate of Patent Document 1 described above. With the electrode plate production method of Patent Document 1, moreover, the number of steps is increased because the coating and drying steps are performed several times respectively. This leads to an increase in the costs of electrode plates and secondary batteries using the same.

The present invention was devised in view of these circumstances and its object is to provide an electrode plate with enhanced bond strength between the active material layer and the current collector plate. Another object is to provide a secondary battery having this electrode plate. Yet another object is to provide a method for producing this electrode plate.

Means of Solving the Problems

One aspect of the present invention to solve the above problem provides an electrode plate including: a current collector plate; and an active material layer formed on the current collector plate, the active material layer containing at least an active material and a binder, wherein the active material layer includes a plurality of binders having glass transition points $Tg$ different from each other as the binder, provided that the active material layer is split into two in a middle in a thickness direction and that a side forming a surface of the active material layer is referred to as a surface section and a side of the current collector plate as a current collector plate section, a ratio (A2/A1) between an amount of the binder contained in the surface section (A2) and an amount of the binder contained in the current collector plate section (A1) is 1.0 to 1.2, and the binder contained in the surface section has an average glass transition point $Tgu$ lower than an average glass transition point $Tgd$ of the binder contained in the current collector plate section.

In this electrode plate, the ratio (A2/A1) between the amount of the binder contained in the surface section (A2) and the amount of the binder contained in the current collector plate section (A1) in the active material layer is 1.0 to 1.2. The active material layer includes the plurality of binders having glass transition points $Tg$ different from each other, wherein the binder contained in the surface section has the average glass transition point $Tgu$ lower than the average glass transition point $Tgd$ of the binder contained in the current collector plate section ($Tgu<Tgd$). With such a distribution of the binder in the active material layer, the bond strength between the active material layer and the current collector plate can be made higher.

"Electrode plates" here include a positive electrode plate including a current collector plate made of aluminum foil, etc, and a positive active material layer containing a positive active material, and a binder, etc, and a negative electrode plate including a current collector plate made of copper foil, etc, and a negative active material layer containing a negative active material, and a binder, etc.

"Active material layer" includes at least an active material and a binder as described above, and may additionally contain conductive additives, viscosity increasing agents (thickening agents), etc.

"Active material" includes, for example, if the electrode plate is for use in a lithium ion secondary battery, lithium metal oxides such as lithium cobalt oxide, lithium manganese oxide, lithium nickel oxide (positive active materials), and carbon materials such as graphite and hard carbon (negative active materials).

"Binder" includes, for example, polyvinylidene fluoride (PVDF) and styrene-butadiene rubber (SBR).

"Conductive additives" include, for example, activated carbon, graphite fine powder, and carbon fiber.

"Viscosity increasing agents" include, for example, carboxymethyl cellulose (CMC).

Further, in the electrode plate described above, preferably, the active material layer includes, as the binder, a first binder and a second binder having a glass transition point $Tg2$ lower than a glass transition point $Tg1$ of the first binder, and the surface section contains more second binder than the first binder while the current collector plate section contains more first binder than the second binder.

The active material layer of this electrode plate includes, as the binder, the first binder and the second binder having the glass transition point $Tg2$ lower than the glass transition point $Tg1$ of the first binder, such that the surface section contains more second binder than the first binder while the current collector plate section contains more first binder than the second binder. With such a distribution of binder in the active material layer, the bond strength between the active material layer and the current collector plate can be made higher without using many binders but only two types of binders.

Further, in the electrode plate described above, preferably, the plurality of binders are styrene-butadiene rubbers (SBR) having the glass transition points Tg different from each other.

In this electrode plate, the plurality of binders mentioned above are all styrene-butadiene rubbers (SBR). Since SBR has a strong bond, the amount of the binder contained in the active material layer can be made small to reduce the internal resistance of the active material layer, while the bond strength between the active material layer and the current collector plate can be made sufficiently high.

Another aspect provides a secondary battery including one of the electrode plates described above.

Since this secondary battery uses the above-described electrode plate, it can have a high bond strength between the active material layer and the current collector plate and good durability.

Another aspect provides a method for producing an electrode plate including: a current collector plate; and an active material layer formed on the current collector plate, the active material layer containing at least an active material and a binder, the active material layer including a plurality of binders having glass transition points Tg different from each other as the binder, provided that the active material layer is split into two in a middle in a thickness direction and that a side forming a surface of the active material layer is referred to as a surface section and a side of the current collector plate as a current collector plate section, a ratio (A2/A1) between an amount of the binder contained in the surface section (A2) and an amount of the binder contained in the current collector plate section (A1) being 1.0 to 1.2, and the binder contained in the surface section having an average glass transition point $Tgu$ lower than an average glass transition point $Tgd$ of the binder contained in the current collector plate section, wherein the method includes: a first coating step of coating a first active material paste containing a first coating binder consisting of at least one of the plurality of binders and having an average glass transition point $Tga$, and the active material, on the current collector plate to form a first coated film of the first active material paste on the current collector plate, a second coating step, after the first coating step, of coating a second active material paste containing a second coating binder consisting of at least one of the plurality of binders and having an average glass transition point $Tgb$ lower than the average glass transition point $Tga$ of the first coating binder, and the active material, on the first coated film to form a second coated film of the second active material paste on the first coated film; and a drying step, after the second coating step, of drying the first coated film and the second coated film simultaneously to form the active material layer from the first coated film and the second coated film The electrode plate produced by this electrode plate production method has the above-described active material layer, wherein the ratio (A2/A1) between the amount of the binder contained in the surface section (A2) and the amount of the binder contained in the current collector plate section (A1) is 1.0 to 1.2, and wherein the binder contained in the surface section has an average glass transition point $Tgu$ lower than the average glass transition point $Tgd$ of the binder contained in the current collector plate section. Therefore, the bond strength between the active material layer and the current collector plate can be made higher.

In addition, in this electrode plate production method, since the first coating step, second coating step, and drying step described above are performed in this order to form the active material layer, the active material layer having the above-described characteristics can be made easily. Namely, in this production method, the coated film consisting of the first coated film and the second coated film laminated thereon through the first and second coating steps is dried. As the solvent vaporizes from the surface of the coated film, the binder tries to migrate toward the surface side of the coated film with the solvent, but when compared under the same temperature condition, the binder with a higher glass transition point Tg has a higher viscosity and is harder to migrate. Therefore, the first coating binder contained in the first coated film having a relatively higher glass transition point Tg is harder to migrate than the second coating binder contained in the second coated film having a relatively lower glass transition point Tg. Accordingly, the uneven distribution of binder (more binder on the surface side and less binder on the current collector plate side) in the active material layer after the drying step can be made less uneven. Thus the above-described active material layer is formed.

Further, in this electrode plate production method, the drying step need not be performed several times, i.e., after each of the first and second coating steps but need only be performed after the second coating step, and thus the number of steps can be reduced.

The "First active material paste" and the "second active material paste" may be prepared, for example, by mixing the active material and binder, etc with a solvent such as water or N-methylpyrrolidone (NMP). Conductive additives, thickeners, etc, for example, may be added to the "first active material paste" and the "second active material paste" in addition to the active material and binder.

Any of the known printing techniques may be suitably selected for the coating of the first coated film on the current collector plate and for the coating of the second coated film on the first coated film Examples include gravure printing, gravure reverse printing, die coating, and slide coating.

The thickness of the "first coated film" and the "second coated film" need not necessarily be the same and may respectively be changed as required. In other words, the "first coated film" and the "second coated film" need not be absolutely matched with the "current collector plate section" and the "surface section" of the active material layer, respectively.

For example, the "first coated film" may be formed thin while the "second coated film" is formed thick so as to form the "current collector plate section" of the active material layer by the "first coated film" and part of the "second coated film", and to form the "surface section" by the remaining part of the "second coated film". Or conversely, the "first coated film" may be formed thick while the "second coated film" is formed thin so as to form the "current collector plate section" of the active material layer by part of the "first coated film", and to form the "surface section" by the remaining part of the "first coated film" and the "second coated film".

Further, it is preferable to use, in the electrode plate production method described above, a first active material paste and a second active material paste prepared such that a weight concentration of the second coating binder in a solid content of the second active material paste is lower than a weight concentration of the first coating binder in a solid content of the first active material paste.

In this electrode plate production method, the above-described first and second active material pastes are used to form the first and second coated films, which in turn form the active material layer, so that the distribution of binder in the active material layer can be made less uneven more effectively, and the ratio (A2/A1) between the amount of the binder in the surface section (A2) and the amount of the binder in the current collector plate section (A1) can be made even smaller (closer to 1.0). Namely, in this production method, the coated film consisting of the first coated film and the second coated film laminated thereon formed using the above-described first and second active material pastes is dried. As the solvent vaporizes from the surface of the coated film, the binder tries to migrate toward the surface side of the coated film with the solvent. However, since the binder (first coating binder) contained in the first coated film is more than the binder (second coating binder) contained in the second coated film, the uneven distribution of the binder (more binder on the surface side and less binder on the current collector plate side) in the active material layer after the drying step can be made less uneven more effectively. Thus the bond strength between the active material layer and the current collector plate can be made higher.

Further, in one of the electrode plate production methods described above, preferably, the active material layer includes, as the binder, a first binder and a second binder having a glass transition point Tg2 lower than a glass transition point Tg1 of the first binder, the surface section contains more second binder than the first binder while the current collector plate section contains more first binder than the second binder, and the first coating step uses the first active material paste consisting at least of the first binder, out of the first and second binders, as the first coating binder, and the second coating step uses the second active material paste consisting at least of the second binder, out of the first and second binders, as the second coating binder.

With this electrode plate production method, not many binders but only two types of binders (first and second binders) are used as the binder to form the above-described active material layer, and therefore the active material layer can be made easily.

Further, in one of the electrode plate production methods described above, it is preferable to use styrene-butadiene rubbers (SBR) having glass transition points Tg different from each other as the plurality of binders.

With this electrode plate production method, styrene-butadiene rubbers (SBR) are used for the above-described plurality of binders. Since SBR has a strong bond, the amount of the first coating binder added to the first active material paste and the amount of the second coating binder added to the second active material paste can be respectively reduced, whereby the internal resistance of the active material layer can be made lower while the bond strength between the active material layer and current collector plate can be made sufficiently high.

| DESCRIPTION OF THE REFERENCE SIGNS | |
|---|---|
| 100, 200 | Lithium ion secondary battery (Secondary battery) |
| 120 | Wound electrode body |
| 121 | Positive electrode plate (Electrode plate) |
| 122 | Current collector plate |
| 123 | Positive active material layer |
| 131, 231 | Negative electrode plate (Electrode plate) |
| 132 | Current collector plate |
| 133, 233 | Negative active material layer |
| 133a, 233a | Surface (of Negative active material layer) |
| 133e, 233e | Current collector plate section |
| 133f, 233f | Surface section |
| 133x, 233x | First coated film |
| 133y, 233y | Second coated film |
| 133z, 233z | Coated film |
| 135 | Binder |
| 135e | First binder |
| 135f | Second binder |
| 700 | Vehicle (Hybrid electric vehicle) |
| 800 | Battery-powered equipment (Hammer drill) |

-continued

DESCRIPTION OF THE REFERENCE SIGNS

| | |
|---|---|
| Tgd | Average glass transition point (of Binder of Current collector plate section) |
| Tgu | Average glass transition point (of Binder of Surface section) |
| Tg1 | Glass transition point (of First binder) |
| Tg2 | Glass transition point (of Second binder) |
| Tga | Average glass transition point (of First coating binder) |
| Tgb | Average glass transition point (of Second coating binder) |
| KP1 | First negative active material paste (First active material paste) |
| KP2 | Second negative active material paste (Second active material paste) |
| N1, N3 | Weight concentration (of First coating binder in a solid content of First active material paste) |
| N2, N4 | Weight concentration (of Second coating binder in a solid content of Second active material paste) |

MODE FOR CARRYING OUT THE INVENTION

Embodiment 1

Figure 1:
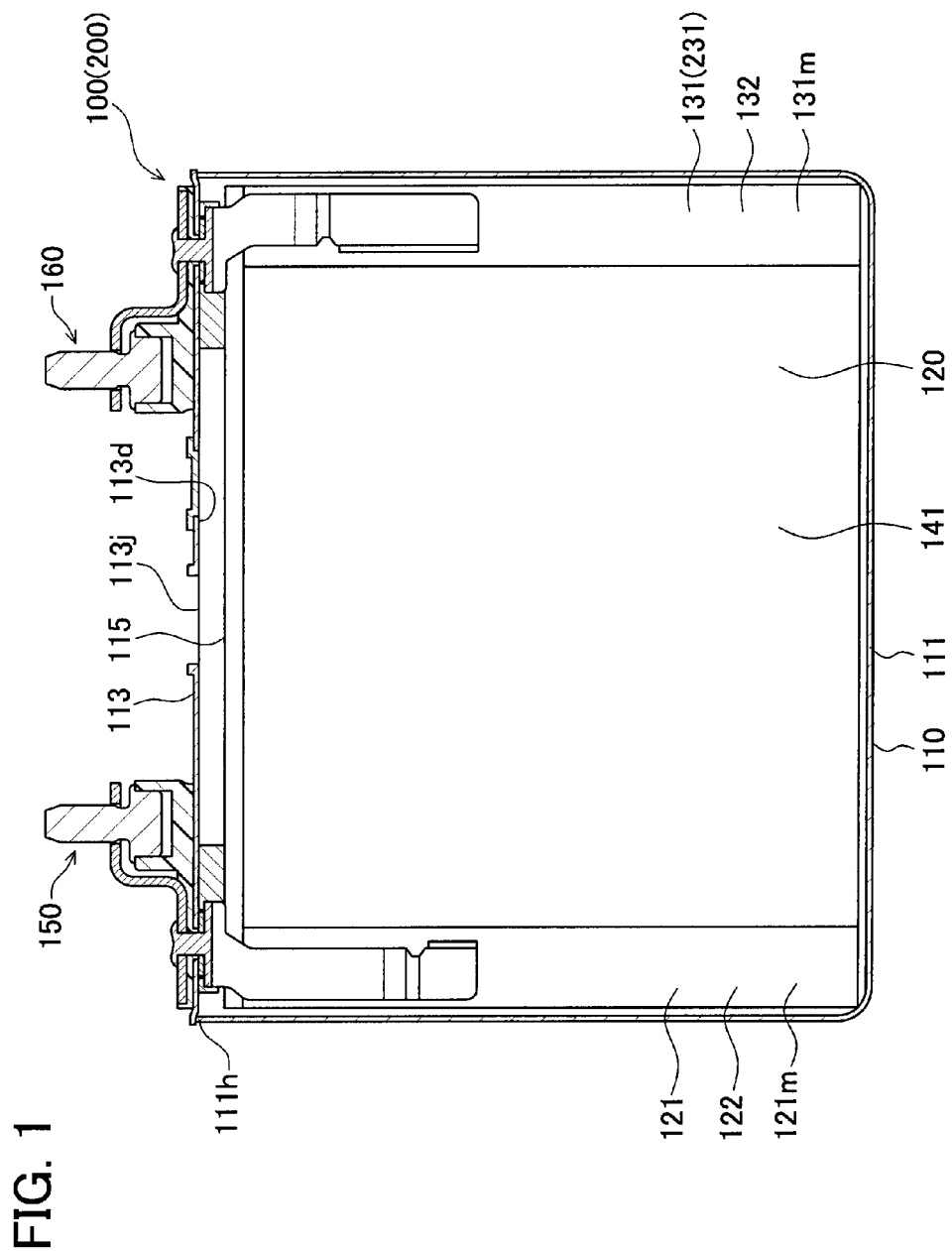
FIG. 1 is a longitudinal cross sectional view of a lithium ion secondary battery of Embodiment 1.
Figure 2:
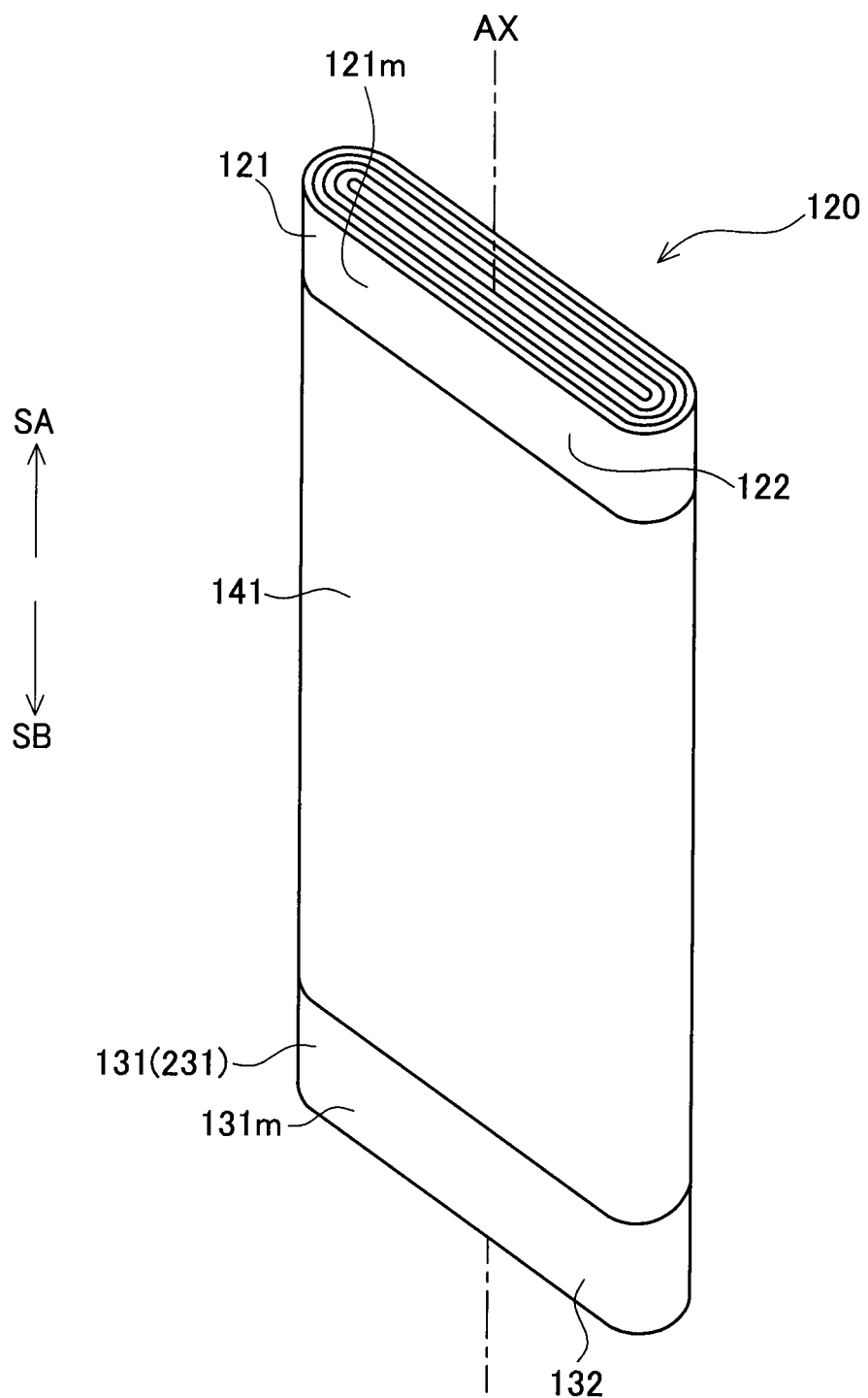
FIG. 2 is a perspective view of a wound electrode body of Embodiment 1.
Figure 3:
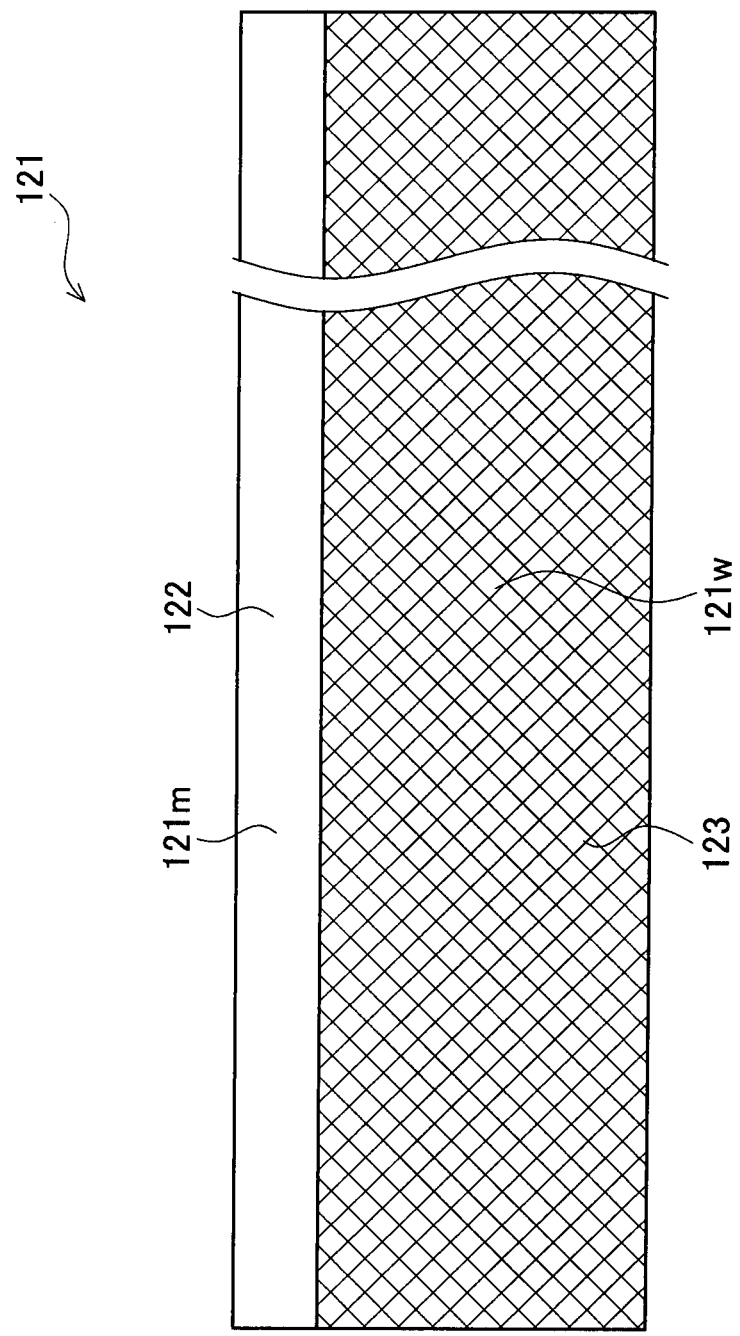
FIG. 3 is a plan view of a positive electrode plate of Embodiment 1.
Figure 4:
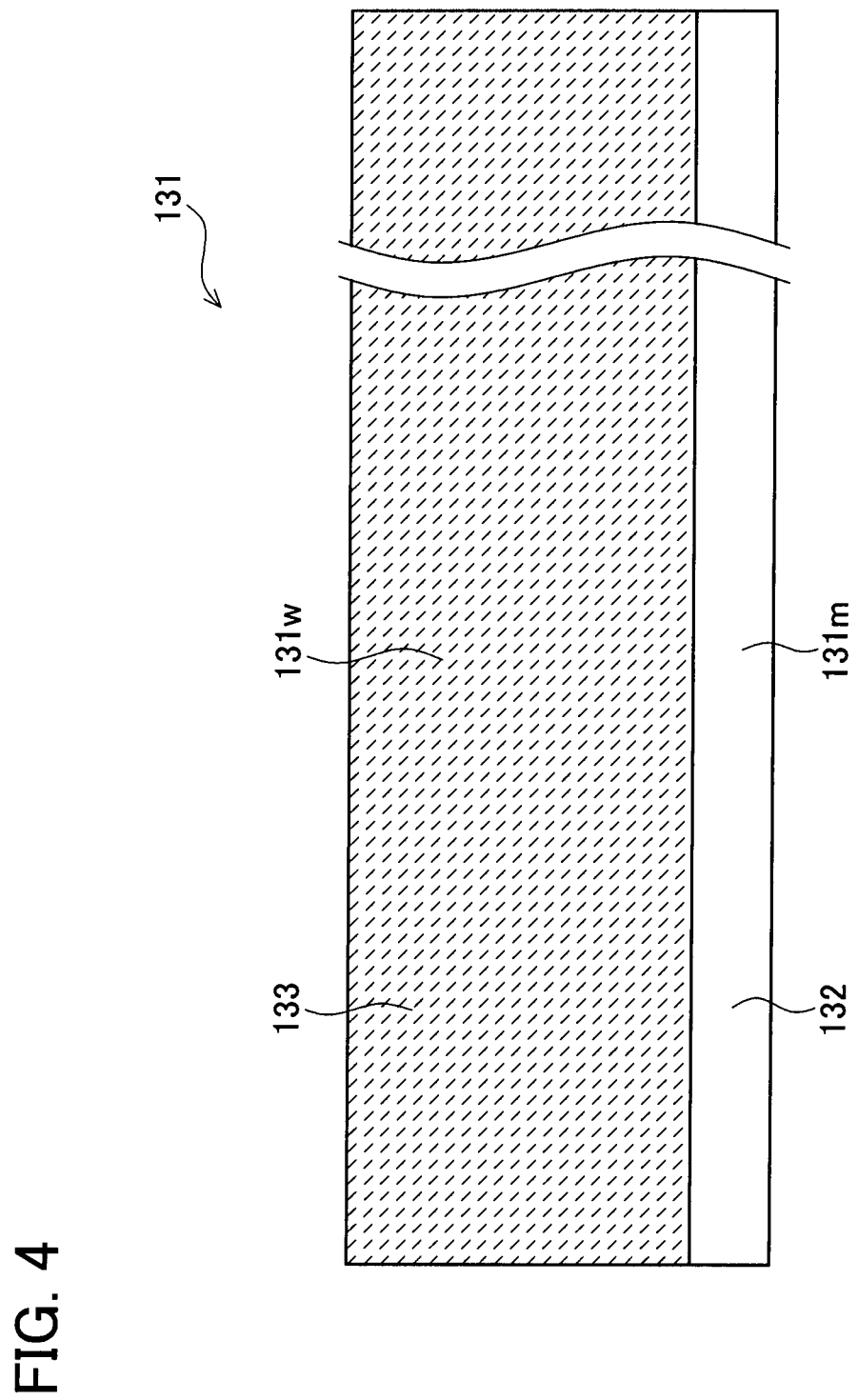
FIG. 4 is a plan view of a negative electrode plate of Embodiment 1.
Figure 5:
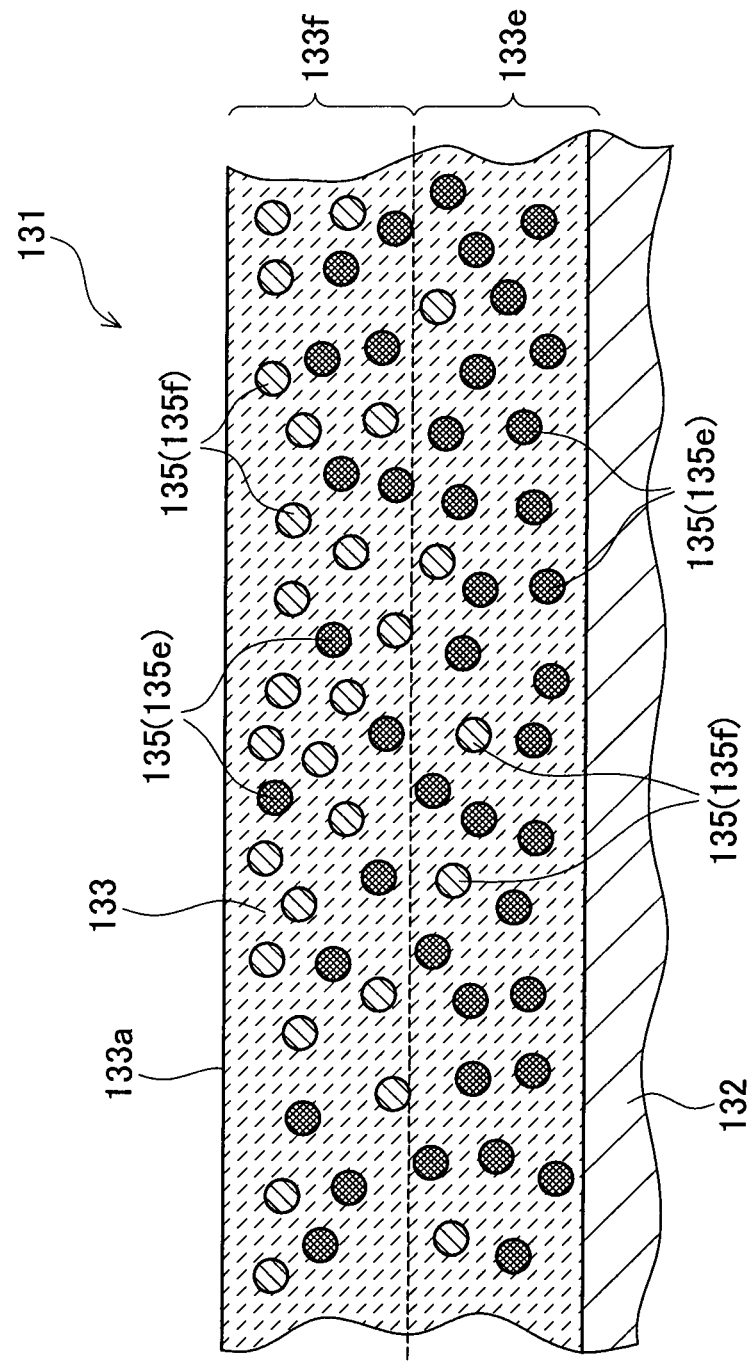
FIG. 5 is a partial enlarged cross sectional view of the negative electrode plate of Embodiment 1.
Figure 6:
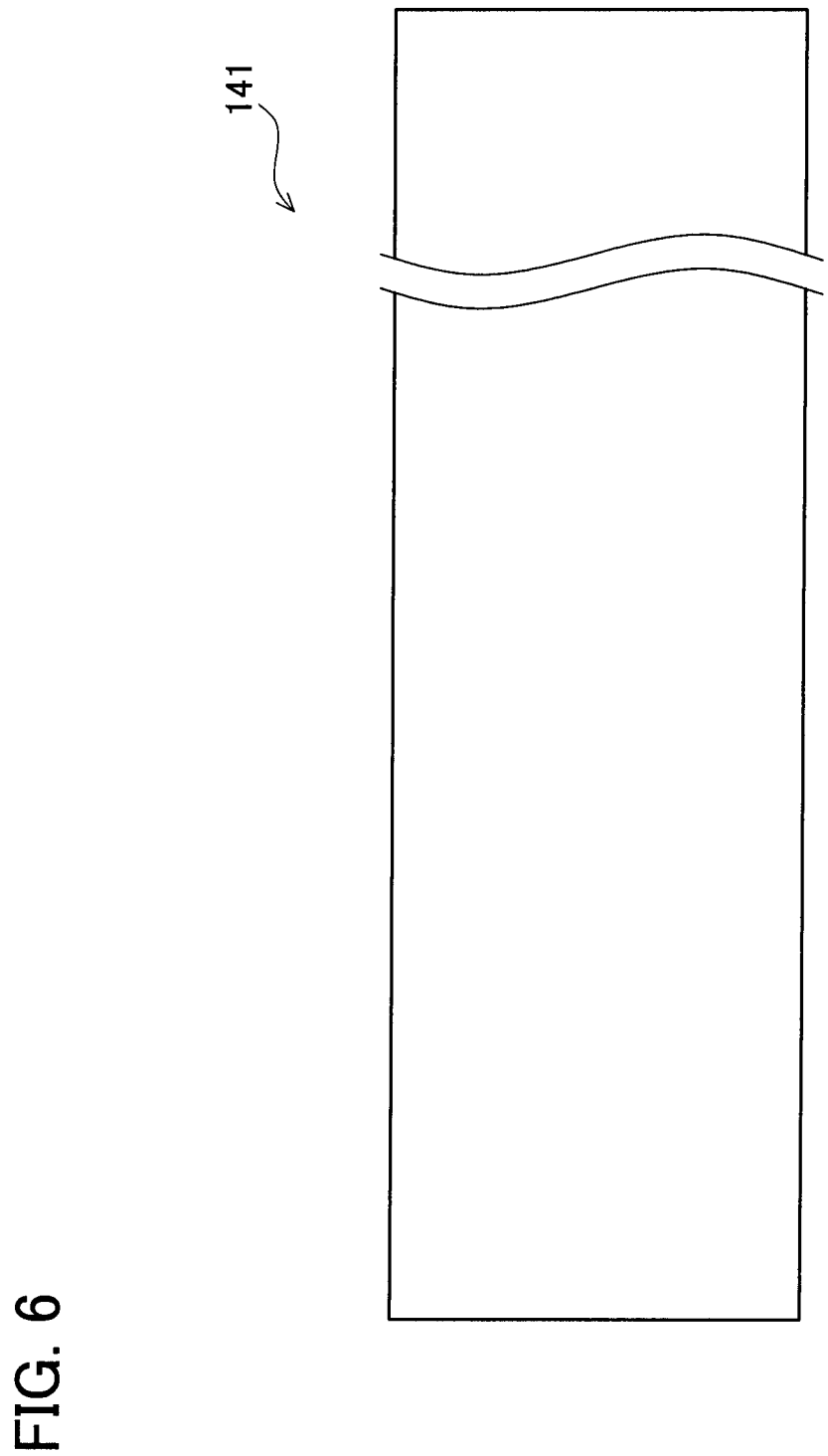
FIG. 6 is a plan view of a separator of Embodiment 1.
Figure 7:
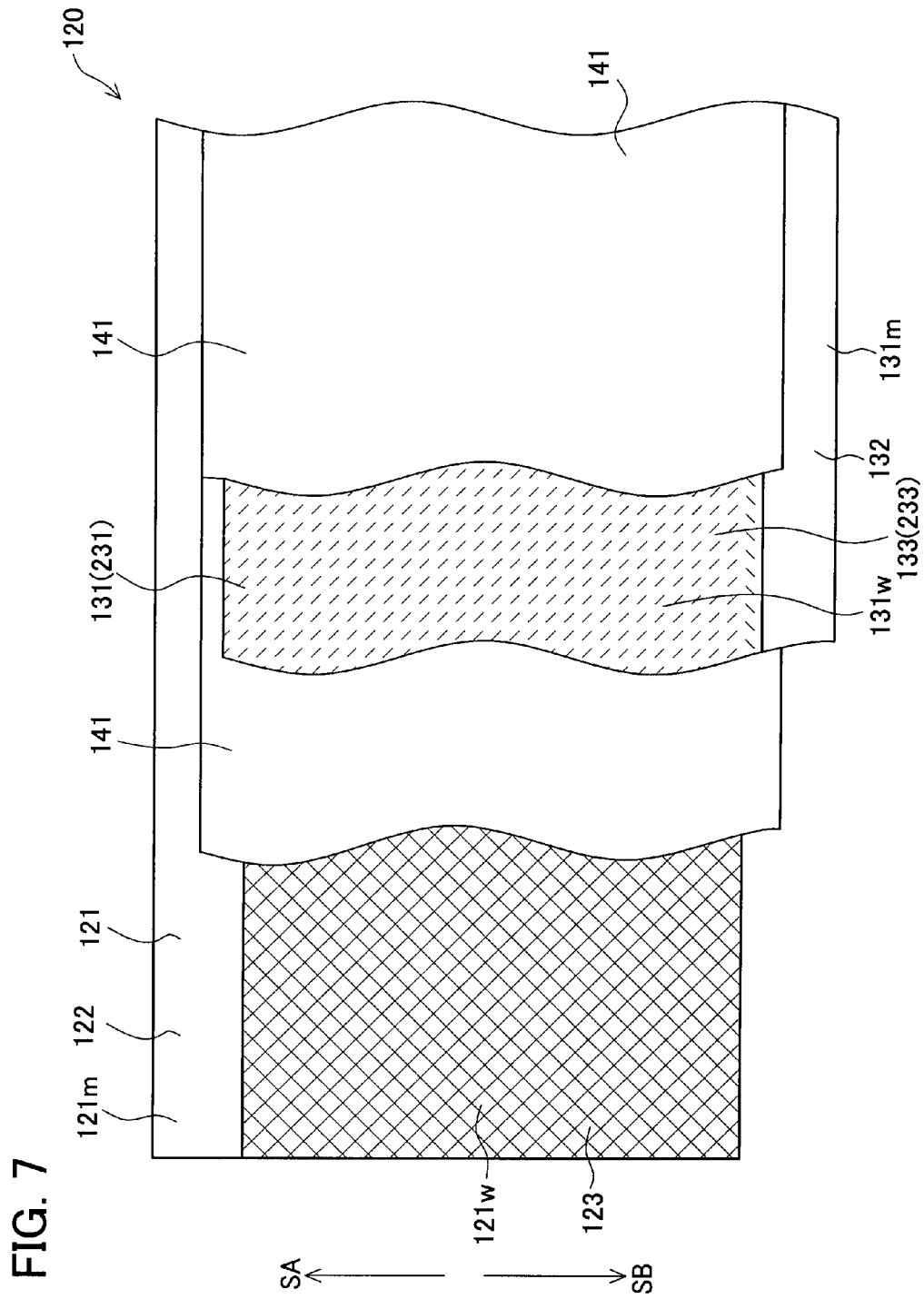
FIG. 7 is a partial plan view showing a state where the positive and negative electrode plates are superposed one on the other while interposing the separator therebetween in Embodiment 1.
Figure 8:
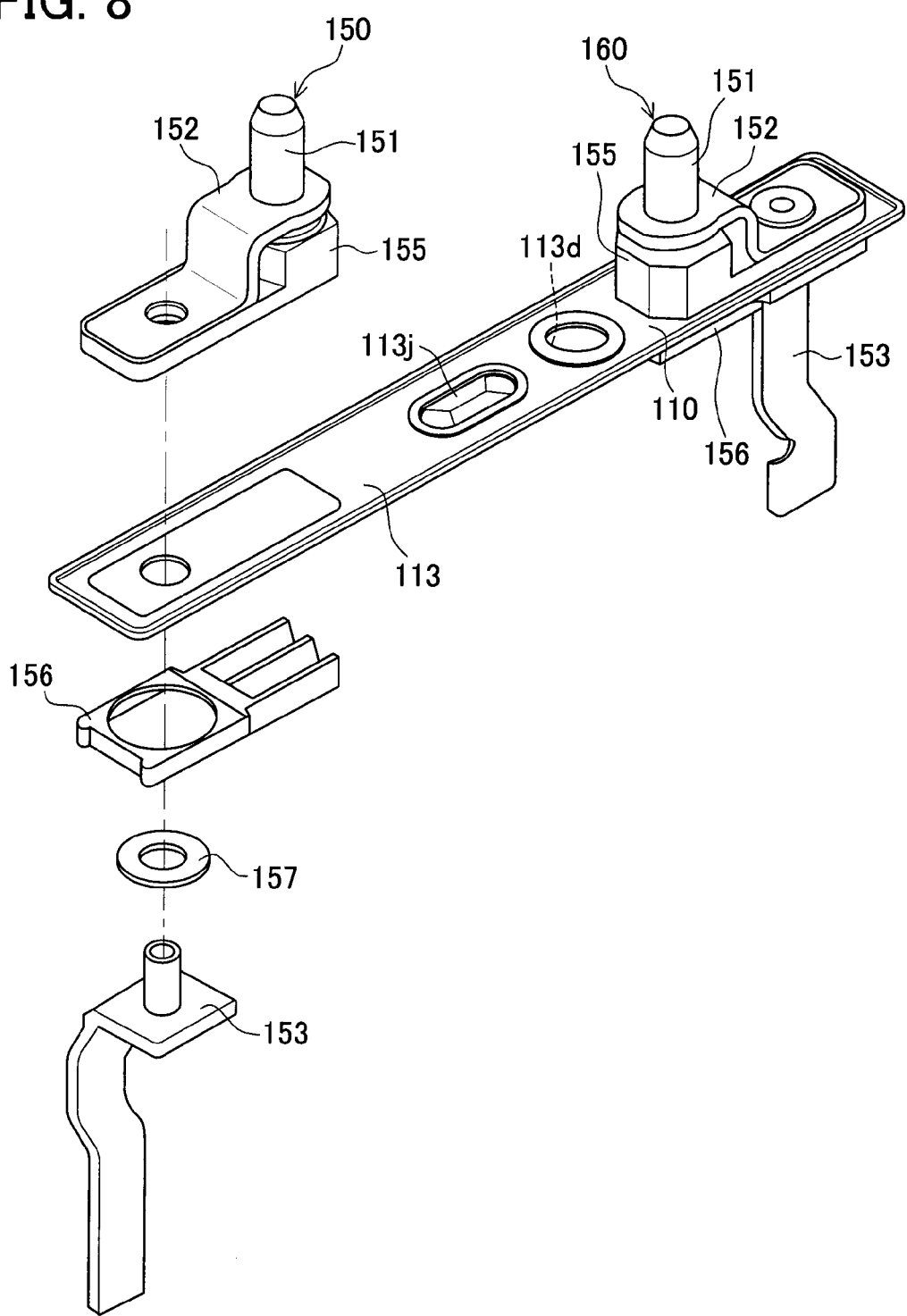
FIG. 8 is an exploded perspective view showing a case lid, a positive electrode terminal member, a negative electrode terminal member, and others in Embodiment 1.

Hereinafter, embodiments of the present invention will be described with reference to the drawings. FIG. 1 shows a lithium ion secondary battery (secondary battery) 100 according to Embodiment 1. FIG. 2 shows a wound electrode body 120 forming this lithium ion secondary battery 100. Further, a positive electrode plate (electrode plate) 121 forming this wound electrode body 120 is shown in FIG. 3, a negative electrode plate (electrode plate) 131 is shown in FIGS. 4 and 5, and a separator 141 is shown in FIG. 6. FIG. 7 shows the positive electrode plate 121 and the negative electrode plate 131 superposed upon one another via the separator 141. FIG. 8 shows details of a case lid member 113, a positive electrode terminal member 150, and a negative electrode terminal member 160, etc.

This lithium ion secondary battery 100 is a rectangular battery mounted on vehicles such as hybrid electric vehicles and electric vehicles or battery-powered equipment such as hummer drills. This lithium ion secondary battery 100 is formed of, for example, a rectangular battery case 110, the wound electrode body 120 accommodated in this battery case 110, and the positive and negative electrode terminal members 150 and 160 supported on the battery case 110 (see FIG. 1). Liquid electrolyte (not shown) is injected into the battery case 110.

The battery case 110 is formed of a box-like case body member 111 having an opening only at the top, and a rectangular plate-like case lid member 113 welded to this case body member 111 such as to close the opening 111h thereof. The case lid member 113 is provided with a safety valve part 113j and a liquid electrolyte inlet port 113d (see FIGS. 1 and 8). To the case lid member 113 are fixedly attached the positive and negative electrode terminal members 150 and 160 that are respectively formed of three terminal metal fittings 151, and 153 via three insulators 155, 156, and 157, respectively (see FIG. 8). The positive electrode terminal member 150 is connected to a positive current collecting portion 121m to be described later of the wound electrode body 120, while the negative electrode terminal member 160 is connected to a negative current collecting portion 131m to be described later of the wound electrode body 120 (see FIG. 1).

Next, the wound electrode body 120 will be described. This wound electrode body 120 is encased in an insulating film envelop 115 made of a bag-shaped insulating film with an opening only at the top and accommodated in the battery case 110, oriented on its side (see FIG. 1). This wound electrode body 120 is formed by winding a strip of positive electrode plate 121 (see FIG. 3) and a strip of negative electrode plate 131 (see FIGS. 4 and 5) superposed upon one another via a strip of air permeable separator 141 (see FIG. 6) around an axis line AX and by compressing these into a flat shape (see FIGS. 7 and 2).

The positive electrode plate 121 has a current collector plate 122 made of a strip of aluminum foil having a thickness of 15 μm as a core, as shown in FIG. 3. In a region occupying part of the width and extending longitudinally on both main surfaces of this current collector plate 122 are respectively provided with positive active material layers (active material layer) 123 in a band shape along the longitudinal direction (left and right direction in FIG. 3) to a thickness of 20 μm on one side. This positive active material layer 123 is formed of a positive active material (active material), a conductive additive, and a binder. In Embodiment 1, $LiNiCoMnO_2$ is used as the positive active material, acetylene black is used as the conductive additive, and PVDF is used as the binder.

Of the positive electrode plate 121, the band-like portion where the current collector plate 122 and positive active material layers 123 are present in the direction of its thickness constitutes a positive electrode portion 121w. This positive electrode portion 121w faces a negative electrode portion 131w to be described later of the negative electrode plate 131 through the separator 141 in the wound electrode body 120 in an assembled state (see FIG. 7). With the positive electrode portion 121w being provided to the positive electrode plate 121, one end (upper end in FIG. 3) in the width direction of the current collector plate 122 extends in the longitudinal direction in a band shape and thereby forms a positive current collecting portion 121m where no positive active material layer 123 is present in the direction of its thickness. Part of the width of this positive current collecting portion 121m protrudes in a spiral form on one side SA of the axial direction from the separator 141 (see FIGS. 2 and 7).

The separator 141 is made of a resin such as polypropylene (PP) or polyethylene (PE). It is porous, and formed in a strip shape as shown in FIG. 6.

Next, the negative electrode plate 131 will be described. This negative electrode plate 131 has a current collector plate 132 made of a strip of copper foil having a thickness of 10 μm as a core, as shown in FIGS. 4 and 5. In a region occupying part of the width and extending longitudinally on both main surfaces of this current collector plate 132 are respectively provided with negative active material layers (active material layer) 133 in a band shape along the longitudinal direction (left and right direction in FIG. 4) to a thickness of 20 μm on one side.

Of the negative electrode plate 131, the band-like portion where the current collector plate 132 and negative active material layers 133 are present in the direction of its thickness constitutes a negative electrode portion 131w. This negative electrode portion 131w entirely faces the separator 141 in the wound electrode body 120 in an assembled state. With the negative electrode portion 131w being provided to the negative electrode plate 131, one end (lower end in FIG. 4) in the width direction of the current collector plate 132 extends in the longitudinal direction in a band shape and thereby forms a negative current collecting portion 131m where no negative active material layer 133 is present in the direction of its thickness. Part of the width of this negative current collecting portion 131m protrudes in a spiral form on the other side SB of the axial direction from the separator 141 (see FIGS. 2 and 7).

The negative active material layer 133 is made of a negative active material (active material), a binder 135, and a thickener. In FIG. 5, for ease of explanation, only the binder 135 is depicted as particles. In Embodiment 1, natural graphite is used as the negative active material, and carboxymethyl cellulose (CMC) is used as the thickener.

The binder 135 contains a first binder 135e having a glass transition point Tg1 of 30° C. and a second binder 135f having a glass transition point Tg2 of −40° C. that is lower than the glass transition point Tg1 of the first binder 135e. The first and second binders 135e and 135f are both styrene-butadiene rubbers (SBR).

The proportion (weight ratio) of the negative active material, the binder 135, and the thickener contained in the entire negative active material layer 133 is 98:1:1.

Provided that this negative active material layer 133 is divided into two in the middle of the thickness direction as indicated by a broken line in FIG. 5, the side forming the surface 133a of the negative active material layer 133 is referred to as a surface section 133f and the side of the current collector plate 132 as a current collector plate section 133e. Then, the ratio (A2/A1) between the amount of the binder 135 contained in the surface section 133f (A2) and the amount of the binder 135 contained in the current collector plate section 133e (A1) is 1.0 to 1.2 (1.1 in this embodiment).

The surface section 133f contains more second binder 135f than the first binder 135e, and conversely, the current collector plate section 133e contains more first binder 135e than the second binder 135f. Accordingly, the average glass transition point Tgu of the binder 135 contained in the surface section 133f is lower than the average glass transition point Tgd of the binder 135 contained in the current collector plate section 133e (Tgu<Tgd).

The amount of the binder 135 contained in the current collector plate section 133e (A1) and the amount of the binder 135 contained in the surface section 133f (A2) were determined as follows: The negative electrode plate 131 was dyed with boron (Br) to let boron adhere to the binder 135 present in the negative active material layer 133. After that, the boron distribution in the thickness direction of the negative active material 131 was obtained through mapping with an electron probe micro analyzer (EPMA). The map image indicating the amounts of boron was processed to quantify the amount of the binder 135 contained in the current collector plate section 133e (A1) and the amount of the binder 135 contained in the surface section 133f (A2) respectively, and then the ratio (A2/A1) was calculated.

Alternatively, the number of particles of binder 135 may be counted through SEM observation to determine the amount of the binder 135 contained in the current collector plate section 133e (A1) and the amount of the binder 135 contained in the surface section 133f (A2) respectively, and to calculate the ratio (A2/A1).

It was confirmed in the following manner that the surface section 133f contains more second binder 135f than the first binder 135e, and the current collector plate section 133e contains more first binder 135e than the second binder 135f: It was determined from measurement results of DSC (differential scanning calorimetry) with samples of negative active material layer 133 scraped off from the current collector plate 132 separately from the current collector plate section 133e and from the surface section 133f.

As described above, the negative electrode plate 131 according to Embodiment 1 has a negative active material layer 133 in which the ratio (A2/A1) between the amount of the binder 135 contained in the surface section 133f (A2) and the amount of the binder 135 contained in the current collector plate section 133e (A1) is 1.0 to 1.2 (specifically, 1.1). The negative active material layer 133 contains a plurality of binders (specifically, first binder 135e and second binder 135d having glass transition points Tg different from each other, such that the average glass transition point Tgu of the binder 135 contained in the surface section 133f is lower than the average glass transition point Tgd of the binder 135 contained in the current collector plate section 133e (Tgu<Tgd). With the binder 135 in the negative active material layer 133 distributed in this manner, the bond strength between the negative active material layer 133 and the current collector plate 132 of the negative electrode plate 131 can be made higher. Also, the internal resistance of the lithium ion secondary battery 100 using this negative electrode plate 131 can be made lower.

Further, the negative active material layer 133 of the negative electrode plate 131 according to Embodiment 1 contains, as the binder 135, a first binder 135e and a second binder 135f having a glass transition point Tg2 lower than the glass transition point Tg1 of the first binder 135e. Moreover, the surface section 133f contains more second binder 135f than the first binder 135e, and the current collector plate section 133e contains more first binder 135e than the second binder 135f. With this configuration, the bond strength between the negative active material layer 133 and the current collector plate 132 can be made higher as well as the internal resistance of the lithium ion secondary battery 100 can be made lower without using many binders but only with two types of binders 135e and 135f.

In Embodiment 1, the first and second binders 135e and 135f are both styrene-butadiene rubbers (SBR). Since SBR has a strong bond, the bond strength between the negative active material layer 133 and the current collector plate 132 can be made sufficiently high while keeping the amount of the binder 135 contained in the negative active material layer 133 low to keep the internal resistance of the negative active material layer 133 low.

With such a negative electrode plate 131, the lithium ion secondary battery 100 according to Embodiment 1 can have better performance and durability.

Next, the method for producing the lithium ion secondary battery 100 described above will be described.

First, the positive electrode plate 121 is fabricated. Namely, the current collector plate 122 made of a strip of aluminum foil is prepared. Then, a positive active material paste (active material paste) containing a positive active material, a conductive additive, and a binder is applied on one main surface of this plate 122 while leaving out the band-like positive current collecting portion 121m extending in the longitudinal direction, and dried with hot air to form a band-like positive active material layer 123. Similarly, the above-noted positive active material paste is applied on the main surface on the side opposite to the plate 122 while leaving out the band-like portion 121m, and dried with hot air to form a band-like positive active material layer 123. After that, the positive active material layers 123 are compressed using a pressure roller in order to increase electrode density. Thus the positive electrode plate 121 is formed (see FIG. 3).

The negative electrode plate 131 is fabricated separately. Namely, the current collector plate 132 made of a strip of copper foil is prepared. Then, negative active material pastes (active material paste) KP1 and KP2 containing a negative active material, a binder, and a thickener are applied on one main surface of this plate 132 while leaving out the band-like negative current collecting portion 131m extending in the longitudinal direction, and dried with hot air to form a band-like negative active material layer 133.

Figure 9:
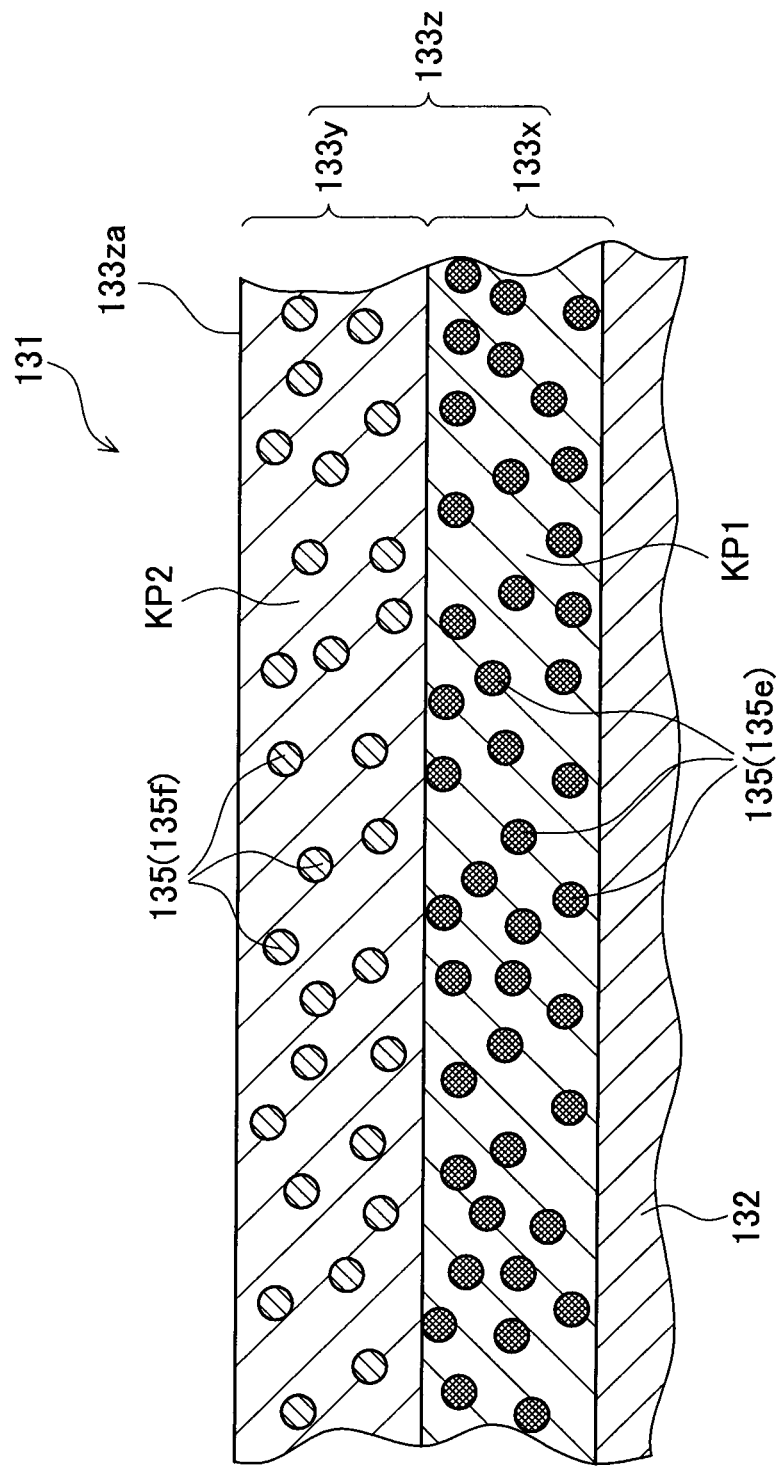
FIG. 9 is an explanatory view for a method for producing the negative electrode plate in Embodiment 1, showing a state where a first coated film and a second coated film formed on a conductive current collector plate.

More specifically, in a first coating step, a first negative active material paste (first active material paste) KP1 containing a negative active material, a first coating binder, and a thickener is coated on the current collector plate 132 by a die coating technique to form a first coated film 133x of the first paste KP1 with a thickness of 15 μm on the current collector plate 132 (see FIG. 9).

In Embodiment 1, the first negative active material paste KP1 was prepared by dispersing the negative active material (natural graphite), the first coating binder to be described next, and the thickener (CMC) in a solvent (specifically, water) with a proportion (weight ratio) of 98:1.2:1. The first coating binder consists only of the first binder 135e (SBR with a glass transition point Tg1 of 30° C.). Therefore, the average glass transition point Tga of this first coating binder is 30° C.

This is followed by a second coating step without performing a step of drying the first coated film 133x. Namely, a second negative active material paste (second active material paste) KP2 containing a negative active material, a second coating binder, and a thickener is coated on the first coated film 133x by a die coating technique to form a second coated film 133y of the second paste KP2 with a thickness of 15 μm on the first coated film 133x (see FIG. 9). Thereby a coated film 133z consisting of the first coated film 133x and the second coated film 133y laminated thereon is formed.

In Embodiment 1, the second negative active material paste KP2 was prepared by dispersing the negative active material (natural graphite), the second coating binder to be described next, and the thickener (CMC) in a solvent (specifically, water) with a proportion (weight ratio) of 98:0.8:1. The second coating binder consists only of the second binder 135f (SBR with a glass transition point Tg2 of −40° C.). Therefore, the average glass transition point Tgb of this second coating binder is −40° C., i.e., lower than the average glass transition point Tga (30° C.) of the first coating binder described above.

The weight concentration N2 of the second coating binder (second binder 135f) in the solid content apart from the solvent of the second negative active material paste KP2 is lower than the weight concentration N1 of the first coating binder (first binder 135e) in the solid content apart from the solvent of the first negative active material paste KP1 (N2<N1). Namely, the weight concentration N1 of the first coating binder (first binder 135e) in the solid content of the first paste KP1 is N1={1.2/(98+1.2+1)}×100=1.20 wt %. On the other hand, the weight concentration N2 of the second coating binder (second binder 135f) in the solid content of the second paste KP2 is N2={0.8/(98+0.8+1)}×100=0.80 wt %. Therefore, the first paste KP1 contains 1.5 times more binder 135 than the second paste KP2.

Next, in the drying step, the coated film 133z is dried (the first and second coated films 133x and 133y are dried simultaneously), to form the negative active material layer 133 from the coated film 133z (first and second coated films 133x and 133y). In Embodiment 1, drying was performed for four minutes with hot air of 120° C. Since the first and second coated films 133x and 133y have an equal thickness as mentioned above in Embodiment 1, the current collector plate section 133e is formed by the first coated film 133x, and the surface section 133f by the second coated film 133y.

Next, the negative active material pastes KP1 and KP2 are applied on the main surface on the opposite side of the current collector plate 132 while leaving out the band-like negative current collecting portion 131m, and dried with hot air to form a band-like negative active material layer 133. That is, the first coating step, second coating step, and drying step described above are performed again to form the negative active material layer 133 on the main surface on the opposite side of the plate 132.

After that, the negative active material layers 133 are compressed using a pressure roller in order to increase electrode density. Thus the negative electrode plate 131 is formed (see FIGS. 4 and 5).

The negative electrode plate 131 produced by the production method of Embodiment 1 has the negative active material layer 133 described above, in which the ratio (A2/A1) between the amount of the binder 135 in the surface section 133f (A2) and the amount of the binder 135 in the current collector plate section 133e (A1) is 1.0 to 1.2 (specifically, 1.1), and in which the average glass transition point Tgu of the binder 135 in the surface section 133f is lower than the average glass transition point Tgd of the binder 135 in the current collector plate section 133e (Tgu<Tgd). Therefore, the bond strength between the negative active material layer 133 and the current collector plate 132 of the negative electrode plate 131 can be made higher. Also, the internal resistance of the lithium ion secondary battery 100 using this negative electrode plate 131 can be made lower.

In addition, with this method for producing electrode plates 131, the negative active material layer 133 can be formed easily since it is formed through the first coating step, the second coating step, and the drying step described above. Namely, in the first and second coating steps, the coated film 133z consisting of the first and second coated films 133x and 133y is formed, using the first and second negative active material pastes KP1 and KP2, the second paste KP2 containing the second coating binder (specifically, second binder 135f) with the average glass transition point Tgb (=Tg2) lower than the average glass transition point Tga (=Tg1) of the first coating binder (specifically, first binder 135e) contained in the first paste KP1 (Tgb<Tga).

Therefore, in the drying step, as the solvent (water) vaporizes from the surface 133za of the coated film 133z, the binder 135 tries to migrate toward the surface 133za side with the solvent, but when compared under the same temperature condition, the first binder 135e with a higher glass transition point Tg1 has a higher viscosity and is harder to migrate than the second binder 135f with a lower glass transition point Tg2. This means that the first coating binder (first binder 135e) contained in the first coated film 133x having a relatively higher glass transition point Tg is harder to migrate than the second coating binder (second binder 135f) contained in the second coated film 133y having a relatively lower glass transition point Tg. Therefore, the uneven distribution of the binder 135 (more binder 135 on the surface 133a side and less binder 135 on the current collector plate 132 side) in the negative active material layer 133 after the drying step can be suppressed.

Furthermore, in Embodiment 1, the coated film 133z consisting of the first and second coated films 133x and 133y is formed using the first and second negative active material pastes KP1 and KP2, in which the weight concentration N2 (specifically, 0.80 wt %) of the second coating binder (second binder 135f) in the solid content of the second paste KP2 is lower than the weight concentration N1 (specifically, 1.20 wt %) of the first coating binder (first binder 135e) in the solid content of the first paste KP1.

Therefore, in the drying step, as the solvent (water) vaporizes from the surface 133za of the coated film 133z, the binder 135 tries to migrate toward the surface 133za side with the solvent. However, since the first coating binder (first binder 135e) contained in the first coated film 133x is higher in concentration than the second coating binder (second binder 1350 contained in the second coated film 133y, the distribution of the binder 135 in the negative active material layer 133 after the drying step can be made less uneven more effectively. Specifically, the ratio (A2/A1) between the amount of the binder 135 in the surface section 133f (A2) and the amount of the binder 135 in the current collector plate section 133e (A1) can be made smaller (1.1) than that (1.2) of Embodiment 2 to be described later. Thus, the bond strength between the negative active material layer 133 and the current collector plate 132 can be made higher, as well as the internal resistance of the lithium ion secondary battery 100 using this negative electrode plate 131 can be made lower.

Further, with the production method of Embodiment 1, it is not necessary to perform the drying step several times, i.e., after each of the first and second coating steps but only after the second coating step, and therefore the number of steps is reduced.

Also, in Embodiment 1, not many binders but only two types of binders (first and second binders 135e and 135Q are used as the binder 135 to form the negative active material layer 133, and therefore the negative active material layer 133 can be made easily.

Also, in Embodiment 1, styrene-butadiene rubber (SBR) is used for both of the first and second binders 135e and 135f. Since SBR has a strong bond, the amount of the first binder 135e added to the first negative active material paste KP1 and the amount of the second binder 135f added to the second negative active material paste KP2 can be respectively reduced, whereby the bond strength between the negative active material layer 133 and the current collector plate 132 can be made sufficiently high while keeping the internal resistance of the layer 133 lower.

Next, a strip of separator 141 is prepared, the positive electrode plate 121 and the negative electrode plate 131 are superposed upon one another via the separator 141 (see FIG. 7), and these are wound around an axis line AX using a winding core. After that, these are compressed into a flat shape (FIG. 2).

Next, the case lid member 113, three types of insulators 155, 156, and 157, and three types of terminal metal fittings 151, 152, and 153 (see FIG. 8) are prepared, the positive and negative electrode terminal members 150 and 160 are fixedly attached to the case lid member 113, and the positive electrode terminal member 150 is connected to the positive current collecting portion 121m of the wound electrode body 120 while the negative electrode terminal member 160 is connected to the negative current collecting portion 131m.

Next, the case body member 111 is prepared, and the wound electrode body 121 is inserted into the case body member 111. After that, the case lid member 113 and the case body member 111 are welded by laser welding to form the battery case 110. After that, liquid electrolyte is injected into the battery case 110 from the liquid electrolyte inlet port 113d, which is then sealed. After that, high temperature aging tests and various other inspections are carried out. Thus the lithium ion secondary battery 100 is completed. Since this lithium ion secondary battery 100 has the negative electrode plate 131 described above, it has good durability due to the high bond strength between the negative active material layer 133 and the current collector plate 132.

Embodiment 2

Next, Embodiment 2 will be described with reference to FIG. 10. In a negative electrode plate 231 and a lithium ion secondary battery 200 according to Embodiment 2, a negative active material layer 233 has a different distribution pattern of the binder 135 from that of the negative active material layer 133 of the negative electrode plate 131 and the lithium ion secondary battery 100 according to Embodiment 1. The method for producing the negative electrode plate 231 also differs from that of the negative electrode plate 131 of Embodiment 1 described above. Other features are similar to Embodiment 1 described above, and therefore description of parts similar to Embodiment 1 will be omitted or simplified.

Figure 10:
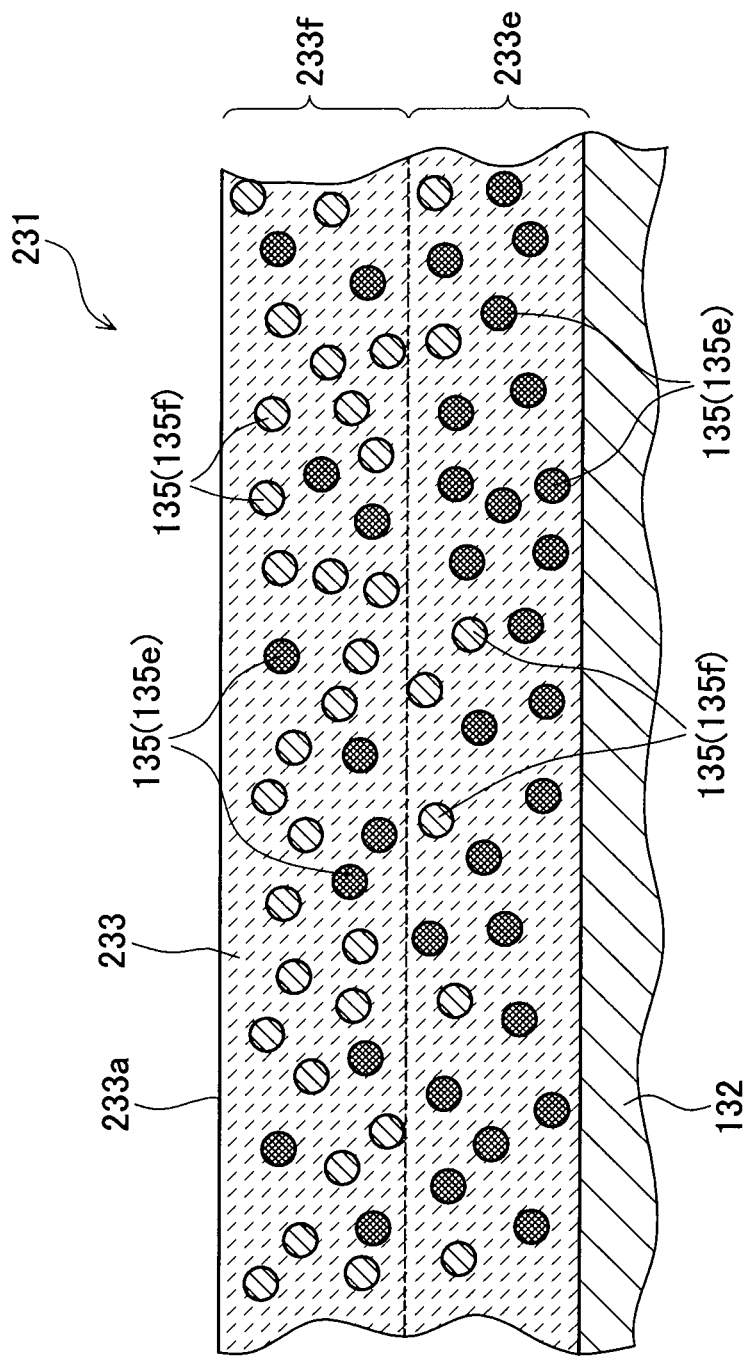
FIG. 10 is a partial enlarged cross sectional view of a negative electrode plate of Embodiment 2.

The negative electrode plate 231 of Embodiment 2 has a current collector plate 132 similar to Embodiment 1, with negative active material layers 233 formed on both main surfaces thereof as shown in FIG. 10. The negative active material layer 233 of Embodiment 2 is formed of a negative active material, a binder 135, and a thickener similarly to the negative active material layer 133 of Embodiment 1, but with a different distribution pattern of the binder 135 from that of Embodiment 1. Namely, provided that this negative active material layer 233 is divided into two in the middle of the thickness direction as indicated by a broken line in FIG. 10, the side forming a surface 233a of the negative active material layer 233 is referred to as a surface section 233f and the side of the current collector plate 132 as a current collector plate section 233e. Then, in Embodiment 2, the ratio (A2/A1) between the amount of the binder 135 contained in the surface section 233f (A2) and the amount of the binder 135 contained in the current collector plate section 233e (A1) is 1.2 (1.1 in Embodiment 1 described above).

Similarly to the negative active material layer 133 of Embodiment 1, the surface section 233f of the negative active material layer 233 in Embodiment 2 contains more second binder 135f than the first binder 135e, and conversely, the current collector plate section 233e contains more first binder 135e than the second binder 135f. Accordingly, the average glass transition point Tgu of the binder 135 contained in the surface section 233f is lower than the average glass transition point Tgd of the binder 135 contained in the current collector plate section 233e (Tgu<Tgd). The proportion (weight ratio) of the negative active material, the binder 135, and the thickener contained in the entire negative active material layer 233 is 98:1:1, similarly to Embodiment 1 described above.

In Embodiment 2, as described above, with the ratio (A2/A1) being 1.0 to 1.2 and the relationship between the average glass transition points Tgu and Tgd being Tgu<Tgd, the bond strength between the negative active material layer 233 and the current collector plate 132 can be made higher, as well as the internal resistance of the lithium ion secondary battery 200 that uses this negative electrode plate 231 can be made lower. Also, the lithium ion secondary battery 200 can have better performance and durability. Other parts similar to Embodiment 1 described above provide the same advantageous effects as those of Embodiment 1.

Next, the method for producing the above negative electrode plate 231 will be described.

A first negative active material paste (first active material paste) KP3 is prepared beforehand, by dispersing a negative active material (natural graphite), the first coating binder to be described next, and the thickener (CMC) in a solvent (water) with a proportion (weight ratio) of 98:1:1, which is different from that of the first negative active material paste KP1 of Embodiment 1 described above. In Embodiment 2, too, the first coating binder consists only of the first binder 135e (SBR with a glass transition point Tg1 of 30° C.). Therefore, the average glass transition point Tga of the first coating binder is 30° C.

The current collector plate 132 made of a strip of copper foil was prepared separately, and, as the first coating step, the first negative active material paste KP3 was applied on the current collector plate 132, to form a first coated film 233x (see FIG. 11) made of the first paste KP3.

A second negative active material paste (second active material paste) KP4 is prepared beforehand, by dispersing a negative active material (natural graphite), the second coating binder to be described next, and the thickener (CMC) in a solvent (water) with a proportion (weight ratio) of 98:1:1, which is different from that of the second negative active material paste KP2 of Embodiment 1 described above. In Embodiment 2, too, the second coating binder consists only of the second binder 135f (SBR with a glass transition point Tg2 of −40° C.). Therefore, the average glass transition point Tgb of the second coating binder is −40° C., which is lower than the average glass transition point Tga (30° C.) of the first coating binder.

In the previously described Embodiment 1, the weight concentration N2 of the second coating binder (second binder 135O in the solid content of the second negative active material paste KP2 was lower than the weight concentration N1 of the first coating binder (first binder 135e) in the solid content of the first negative active material paste KP1 (N2<N1). However, in Embodiment 2, the weight concentration N4 of the second coating binder (second binder 135O in the solid content of the second paste KP4 is equal to the weight concentration N3 of the first coating binder (first binder 135e) in the solid content of the first paste KP3 (N3=N4). Specifically, these weight concentrations N3 and N4 are: N3=N4={1/(98+1+1)}×100=1.00 wt %.

Figure 11:
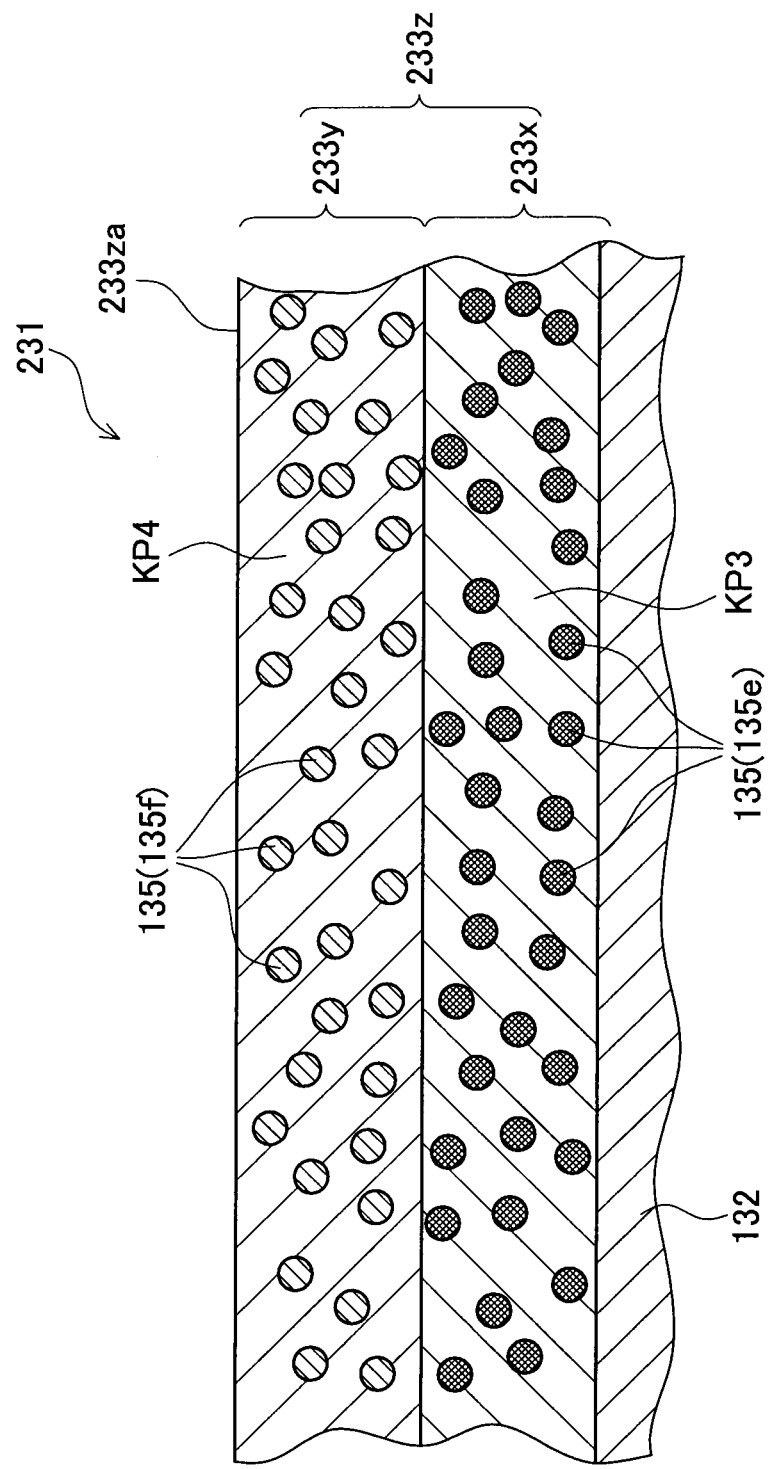
FIG. 11 is an explanatory view for a method of producing the negative electrode plate in Embodiment 2, showing a state where a first coated film and a second coated film formed on a conductive current collector plate.

Then, as a second coating step, this second negative active material paste KP4 was coated on the first coated film 233x to form a second coated film 233y of the second negative active material paste KP4 (see FIG. 11). Thereby a coated film 233z consisting of the first coated film 233x and the second coated film 233y laminated thereon is formed.

After that, a drying step is performed similarly to Embodiment 1 described above to dry the coated film 233z to form the negative active material layer 233.

Next, the first coating step, the second coating step, and the drying step were performed similarly to form a negative active material layer 233 on the main surface on the side opposite to the current collector plate 132. After that, the negative active material layers 233 were compressed using a pressure roller, whereby the negative electrode plate 231 was completed (see FIG. 10).

In Embodiment 2, too, the negative active material layer 233 can be formed easily since it is formed through the first coating step, the second coating step, and the drying step described above. Namely, in the first and second coating steps, the coated film 233z consisting of the first and second coated films 233x and 233y is formed, using the first and second negative active material pastes KP3 and KP4, the second paste KP4 containing the second coating binder (second binder 135O with the average glass transition point Tgb (=Tg2) lower than the average glass transition point Tga (=Tg1) of the first coating binder (first binder 135e) contained in the first paste KP3.

Therefore, in the drying step, as the solvent (water) vaporizes from the surface 233za of the coated film 233z, the binder 135 tries to migrate toward the surface 233za side with the solvent, but when compared under the same temperature condition, the first binder 135e with a higher glass transition point Tg1 has a higher viscosity and is harder to migrate than the second binder 135f with a lower glass transition point Tg2. This means that the first coating binder (first binder 135e) contained in the first coated film 233x having a relatively higher glass transition point Tg is harder to migrate than the second coating binder (second binder 135O contained in the second coated film 233y having a relatively lower glass transition point Tg. Therefore, the distribution of the binder 135 in the negative active material layer 233 after the drying step can be made less uneven, and the ratio (A2/A1) between the amount of the binder 135 in the surface section 233f (A2) and the amount of the binder 135 in the current collector plate section 233f (A1) can be kept as low as 1.2.

Further, with the production method of Embodiment 2, too, it is not necessary to perform the drying step several times, i.e., after each of the first and second coating steps but only after the second coating step, and therefore the number of steps is reduced. Other parts similar to Embodiment 1 described above provide the same advantageous effects as those of Embodiment 1.

EXAMPLES

Next, results of tests carried out to verify the effects of the present invention will be described.

The negative electrode plate 131 of Embodiment 1 was prepared as Example 1, and the negative electrode plate 231 of Embodiment 2 was prepared as Example 2, of the present invention.

As described above, the ratio (A2/A1) between the amount of the binder 135 contained in the surface section 133f (A2) and the amount of the binder 135 contained in the current collector plate section 133e (A1) was 1.1 in the negative active material layer 133 of the negative electrode plate 131 of Example 1. The average glass transition point Tgu of the binder 135 contained in the surface section 133f was lower than the average glass transition point Tgd of the binder 135 contained in the current collector plate section 133e (Tgu<Tgd). The overall rating of the distribution of binder 135 in this negative active material layer 133 was ⊙ (very even). This overall rating is based on a visual evaluation of an image of the distribution of the binder 135 to which boron was adhered, obtained through mapping with an EPMA as described above.

The negative active material layer 233 of the negative electrode plate 231 according to Example 2 had a ratio (A2/A1) of 1.2, and the average glass transition points Tgu and Tgd had a relationship of Tgu<Tgd. The overall rating of the distribution of the binder 135 in this negative active material layer 233 was ○ (even).

As Comparative Example 1, a negative electrode plate having a negative active material layer with a ratio (A2/A1) of 2.2, and with the average glass transition points Tgu and Tgd having a relationship of Tgu=Tgd was prepared. The negative active material layer was formed by coating and drying, each performed once, using a negative active material paste mixed with only the first binder 135e having a high glass transition point Tg1 as the binder 135 (negative active material: first binder: thickener=98:1:1). The overall rating of the distribution of the binder 135 in this negative active material layer was × (very uneven).

As Comparative Example 2, a negative electrode plate having a negative active material layer with a ratio (A2/A1) of 1.3, and with the average glass transition points Tgu and Tgd having a relationship of Tgu=Tgd was prepared. The negative active material layer was formed by coating and drying, each performed once, using a negative active material paste mixed with only the second binder 135f having a low glass transition point Tg2 as the binder 135 (negative active material: second binder: thickener=98:1:1). The overall rating of the distribution of the binder 135 in this negative active material layer was Δ (uneven).

As Comparative Example 3, a negative electrode plate having a negative active material layer with a ratio (A2/A1) of 2.0, and with the average glass transition points Tgu and Tgd having a relationship of Tgu=Tgd was prepared. The negative active material layer was formed by coating and drying, each performed once, using a negative active material paste mixed with the same proportion of the first binder 135e and second binder 135f as the binder 135 (negative active material: first binder: second binder: thickener=98:0.5:0.5:1). The overall rating of the distribution of the binder 135 in this negative active material layer was x.

As Comparative Example 4, a negative electrode plate having a negative active material layer with a ratio (A2/A1) of 1.6, and with the average glass transition points Tgu and Tgd having a relationship of Tgu>Tgd was prepared. The negative active material layer was formed by performing the coating twice. Namely, the first coating step was performed using a first negative active material paste mixed only with the second binder 135f as the binder 135 (negative active material: second binder: thickener=98:1:1). This was followed by the second coating step using a second negative active material paste mixed only with the first binder 135e as the binder 135 (negative active material: first binder: thickener=98:1:1). That is, the first binder 135e having a high glass transition point Tg was used for the first negative active material paste and the second binder 135f having a low glass transition point Tg was used for the second negative active material paste in Examples 1 and 2 (Embodiments 1 and 2). On the other hand, in this Comparative Example 4, conversely, the second binder 135f having a low glass transition point Tg was used for the first negative active material paste and the first binder 135e having a high glass transition point Tg was used for the second negative active material paste. After that, the drying step was performed similarly to Embodiments 1 and 2 to form the negative active material layer. The overall rating of the distribution of the binder 135 in this negative active material layer was x.

As Comparative Example 5, a negative electrode plate having a negative active material layer with a ratio (A2/A1) of 1.8, and with the average glass transition points Tgu and Tgd having a relationship of Tgu>Tgd was prepared. The negative active material layer was formed using a first negative active material paste with a higher weight concentration of the second binder 135f than that of Comparative Example 4 and a second negative active material paste with a lower weight concentration of the first binder 135e than that of Comparative Example 4. Specifically, the first coating step was performed using a first negative active material paste mixed only with the second binder 135f in a larger amount than Comparative Example 4 (negative active material: second binder: thickener=98:1.2:1). This was followed by the second coating step using a second negative active material paste mixed only with the first binder 135e in a smaller amount than Comparative Example 4 (negative active material: first binder: thickener=98:0.8:1). The overall rating of the distribution of the binder 135 in this negative active material layer was x (very uneven).

Figure 12:
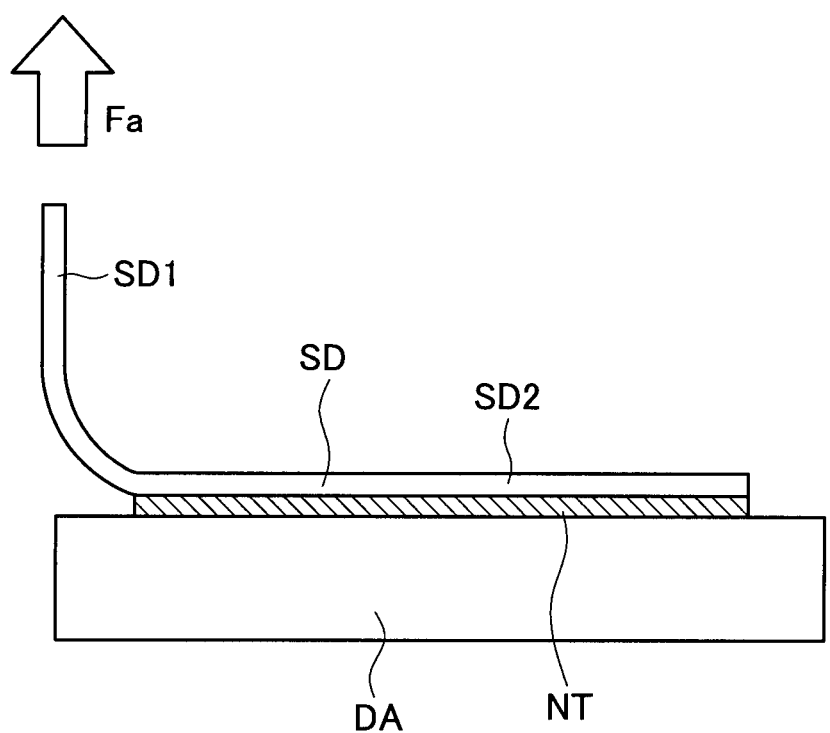
FIG. 12 is an explanatory view showing the outline of a bond strength test.

A bond strength test was carried out to determine the bond between the negative active material layers 133, 233, etc and the current collector plate 132 of the respective negative electrode plates 131, 231, etc of these Examples 1 and 2 and Comparative Examples 1 to 5. Namely, an electrode plate test piece SD of size 120 mm×15 mm was cut out from the negative electrode portions 131w, etc of the negative electrode plates 131, etc according to respective examples (see FIG. 12). A test table DA was set up with a double-sided adhesive tape NT attached thereon, horizontally secured to remain stationary. Leaving out one end SD1 of 40 mm×15 mm from one edge of the cut-out strip of electrode test piece SD, the other remaining end SD2 of 80 mm×15 mm was stuck to the double-sided adhesive tape NT. Then, as one end SD1 was gripped and lifted up vertically as indicated by an arrow in FIG. 12, the force Fa (N) required to peel the electrode test piece SD (the other end SD2) from the double-sided adhesive tape NT was measured. An average value of the force Fa was determined (specifically, an average value of force Fa required from a time point when 20 mm of the other end SD2 was peeled to a time point when 40 mm of the same was peeled), and the bond strength Ka (N/m) per unit length was determined from this average value and the width of the electrode test piece SD (15 mm). The results are shown in Table 1 and FIG. 13.

TABLE 1

| | First negative active material paste | | Second negative active material paste | | Negative active material layer | | | |
|---|---|---|---|---|---|---|---|---|
| | Average glass transition point (° C.) | Weight concentration (wt %) | Average glass transition point (° C.) | Weight concentration (wt %) | Ratio (A2/A1) | Relationship between average glass transition points | Overall rating of distribution | Bond strength Ka (N/m) |
| Example 1 | 30 | 1.2 | −40 | 0.8 | 1.1 | Tgu < Tgd | ⊙ | 3.0 |
| Example 2 | 30 | 1.0 | −40 | 1.0 | 1.2 | Tgu < Tgd | ○ | 2.6 |
| Comparative example 1 | 30 | 1.0 | — | — | 2.2 | Tgu = Tgd | X | 1.2 |
| Comparative example 2 | −40 | 1.0 | — | — | 1.3 | Tgu = Tgd | Δ | 2.4 |
| Comparative example 3 | −5 | 1.0 | — | — | 2.0 | Tgu = Tgd | X | 1.7 |
| Comparative example 4 | −40 | 1.0 | 30 | 1.0 | 1.6 | Tgu > Tgd | X | 2.0 |
| Comparative example 5 | −40 | 1.2 | 30 | 0.8 | 1.8 | Tgu > Tgd | X | 2.1 |

Figure 13:
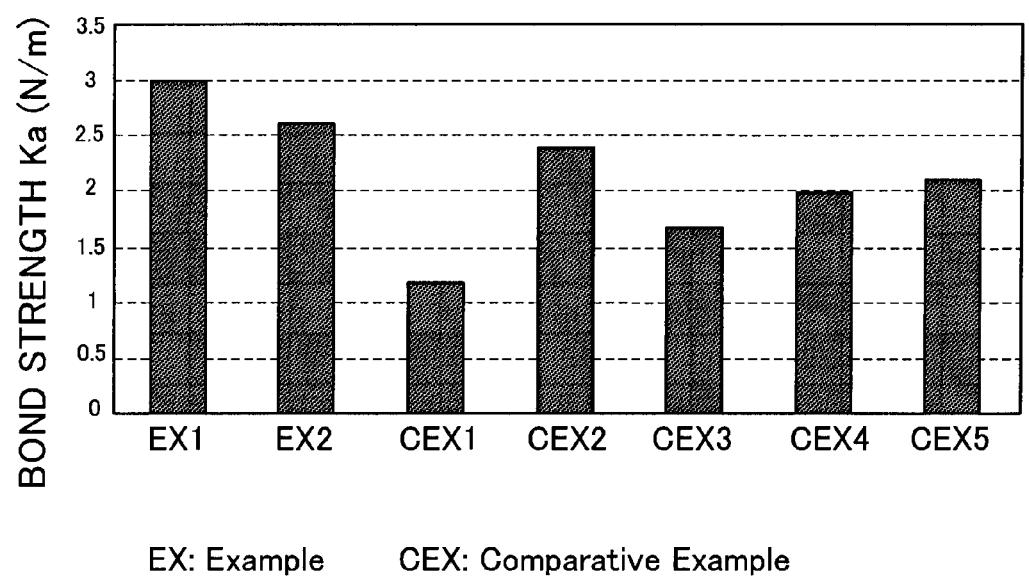
FIG. 13 is a graph showing bond strength Ka of negative electrode plates of Examples 1 and 2 and Comparative Examples 1-5.

It can be seen from the graph of FIG. 13 that the bond strength Ka between the negative active material layer and the current collector plate is enhanced in Examples 1 and 2 as compared to Comparative Examples 1 to 5. With Example 1, in particular, the bond strength Ka can be made higher than with Example 2. These results revealed that the binder distribution can be made less uneven and the bond strength Ka can be enhanced if the ratio (A2/A1) between the amount of the binder in the surface section (A2) and the amount of the binder in the current collector plate section (A1) is 1.0 to 1.2 and the average glass transition point Tgu of the binder in the surface section is lower than the average glass transition point Tgd of the binder in the current collector plate section (Tgu<Tgd). The results revealed that, in particular, the closer the ratio (A2/A1) to 1.0, the less uneven the binder distribution, and the higher the bond strength Ka.

Embodiment 3

Next, Embodiment 3 will be described. A vehicle 700 of Embodiment 3 mounts the lithium ion secondary battery 100 according to Embodiment 1 and uses electric energy stored in this battery 100 for all or part of the drive energy of a drive source.

Figure 14:
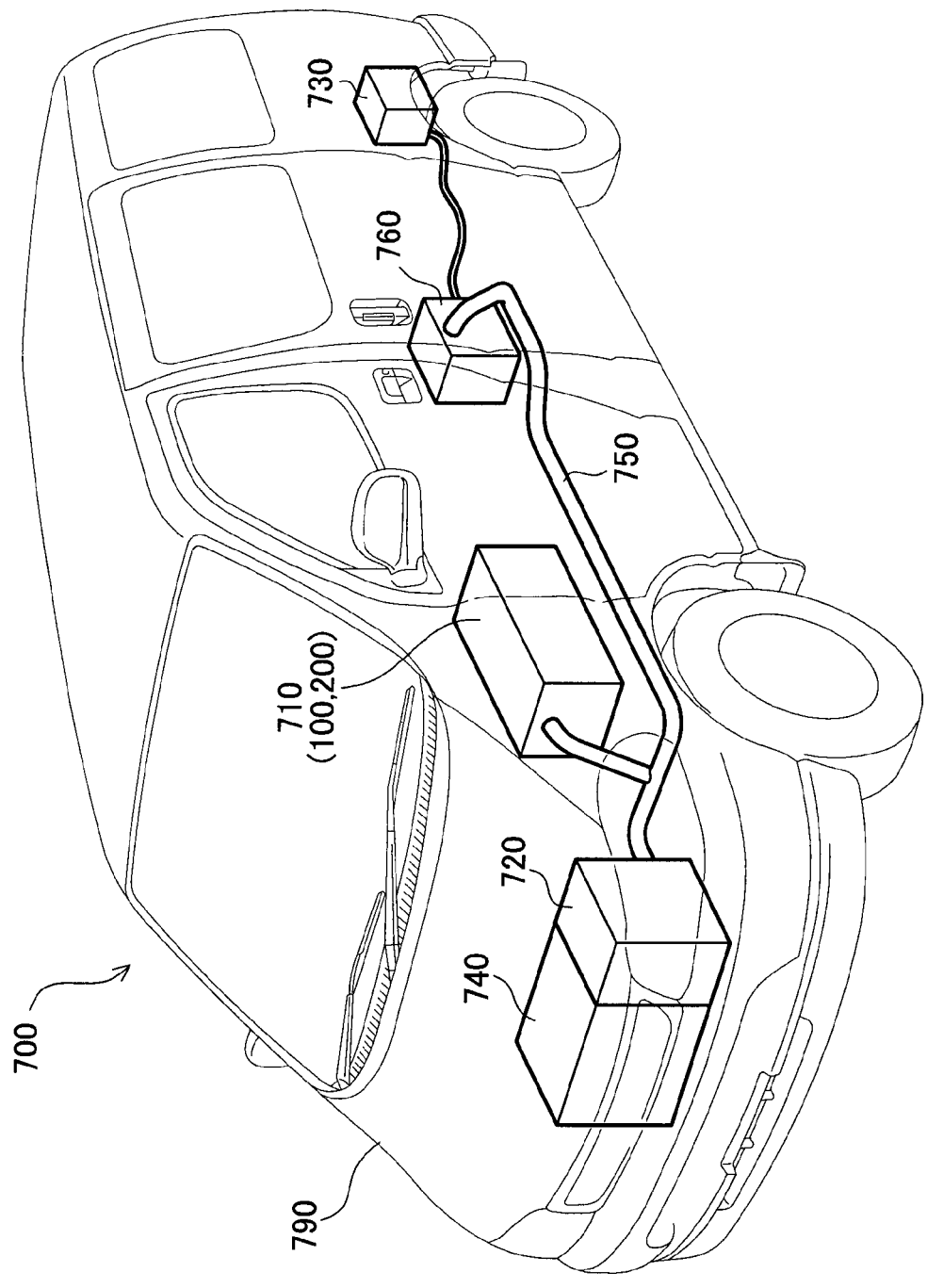
FIG. 14 is an explanatory view showing a vehicle of Embodiment 3.

This vehicle 700 is a hybrid electric vehicle mounted with a plurality of the lithium ion secondary batteries 100 and configured to be driven by an engine 740, a front motor 720, and a rear motor 730 in combination as shown in FIG. 14. Specifically, this hybrid electric vehicle 700 includes a vehicle body 790, the engine 740, the front motor 720 attached to the engine 740, the rear motor 730, a cable 750, and an inverter 760. Further, the hybrid electric vehicle 700 includes a battery assembly 710 internally containing the lithium ion secondary batteries 100 to utilize the electric energy stored in this battery assembly 710 for driving the front motor 720 and the rear motor 730.

As described above, the negative electrode plate 131 is able to make bond strength higher between the negative active material layer 133 and the current collector plate 132 and also reduce resistance of the lithium ion secondary batteries 100 using them. Thus, the lithium ion secondary batteries 100 can have better performance and durability. This also can enhance performance and durability of the hybrid electric vehicle 700 mounted with such batteries 100. Instead of those batteries 100 of Embodiment 1, the lithium ion secondary battery 200 of Embodiment 2 may be mounted.

Embodiment 4

Embodiment 4 will be described below. A battery-powered equipment 800 of Embodiment 4 mounts the lithium ion secondary battery 100 of Embodiment 1 mentioned above and uses this battery 100 as at least one of energy sources.

Figure 15:
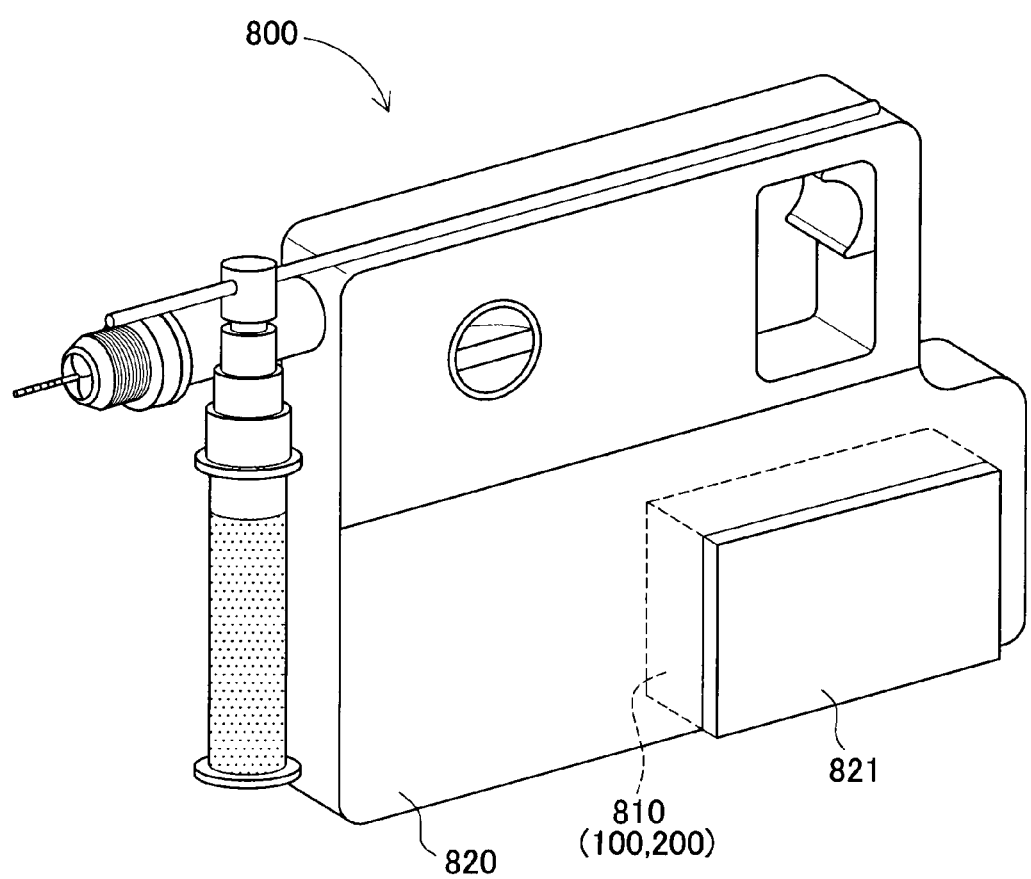
FIG. 15 is an explanatory view showing a battery-powered equipment of Embodiment 4.

This battery-powered equipment 800 is a hammer drill mounted with a battery pack 810 containing the lithium ion secondary battery 100 of Embodiment 1 as shown in FIG. 15. This hammer drill 800 accommodates the battery pack 810 in a bottom 821 of a body 820. This battery pack 810 is utilized as an energy source for driving the drill.

As described above, the negative electrode plate 131 can enhance bond strength between the negative active material layer 133 and the current collector plate 132 and also reduce resistance of the lithium ion secondary batteries 100 using them. Thus, the lithium ion secondary batteries 100 can have better performance and durability. This also can enhance performance and durability of the battery-powered equipment 800 mounted with such batteries 100. Instead of those batteries 100 of Embodiment 1, the lithium ion secondary battery 200 of Embodiment 2 may be mounted.

The present invention is explained in the above Embodiments 1-4 but is not limited thereto. The present invention may be embodied in other specific forms without departing from the essential characteristics thereof.

For instance, although the present invention is applied to the negative electrode plates 131 and 231 and its production method in the above Embodiments 1 and 2, the present invention may also be applied to the positive electrode plate 121 and its production method.

In the above Embodiments 1 and 2, the negative active material layers 133 and 233 are formed by use of the first negative active material paste KP1 containing the first coating binder consisting only of the first binder 135e and the second negative active material paste KP2 containing the second coating binder consisting only of the second binder 135f, but not limited thereto. For instance, the first negative active material paste containing the first coating binder consisting of the first binder 135e and the second binder 135f and the second negative material paste containing the second coating binder consisting of the first binder 135e and the second binder 135f may be used. In this case, the average glass transition point Tgb of the second coating binder is also set lower than the average glass transition point Tga of the first coating binder (Tgb<Tga).

Furthermore, the negative active material paste containing the first coating binder consisting of three or more kinds of binders and the second negative active material paste containing the second coating binder consisting of three or more kinds of binders may be used. In this case, similarly, the average glass transition point Tgb of the second coating binder is set lower than the average glass transition point Tga of the first coating binder (Tgb<Tga).

Although Embodiment 3 exemplifies the hybrid electric vehicle 700 as a vehicle mounted with the lithium ion secondary batteries 100 and 200 according to the present invention, the invention is not limited thereto. Other applicable vehicles may include an electric vehicle, a plug-in hybrid electric vehicle, a hybrid railroad vehicle, a forklift, an electric wheelchair, an electric bicycle, and an electric scooter.

Although Embodiment 4 exemplifies the hammer drill 800 as the battery-powered equipment mounted with the lithium ion secondary batteries 100 and 200 according to the present invention, the invention is not limited thereto. Other applicable battery-powered equipments may include various battery-driven household electric appliances; office equipment and industrial equipment, such as personal computers, cellular phones, battery-driven electric tools, and permanent power supply systems.

The invention claimed is:

1. An electrode plate including:
    a current collector plate; and
    an active material layer formed on the current collector plate, the active material layer containing at least an active material and a binder,
    wherein the binder includes a plurality of binders having glass transition points Tg different from each other,
    provided that the active material layer is split into two portions in a middle in a thickness direction and that a portion forming a surface of the active material layer is referred to as a surface section and another portion contacting the current collector plate as a current collector plate section,
    a ratio (A2/A1) between an amount of the binder contained in the surface section (A2) and an amount of the binder contained in the current collector plate section (A1) is 1.0 to 1.2, and
    the binder contained in the surface section has an average glass transition point Tgu lower than an average glass transition point Tgd of the binder contained in the current collector plate section.

2. The electrode plate according to claim 1, wherein
    the active material layer includes, as the binder, a first binder and a second binder having a glass transition point Tg2 lower than a glass transition point Tg1 of the first binder, and
    the surface section contains more second binder than the first binder while the current collector plate section contains more first binder than the second binder.

3. The electrode plate according to claim 2, wherein the plurality of binders are styrene-butadiene rubbers (SBR) having the glass transition points Tg different from each other.

4. The electrode plate according to claim 1, wherein the plurality of binders are styrene-butadiene rubbers (SBR) having the glass transition points Tg different from each other.

5. A secondary battery including the electrode plate according to claim 1.

6. A secondary battery including the electrode plate according to claim 2.

7. A secondary battery including the electrode plate according to claim 4.

8. A secondary battery including the electrode plate according to claim 3.

9. A method for producing an electrode plate including:
a current collector plate; and
an active material layer formed on the current collector plate, the active material layer containing at least an active material and a binder,
the binder including a plurality of binders having glass transition points Tg different from each other as the binder,
provided that the active material layer is split into two portions in a middle in a thickness direction and that a portion forming a surface of the active material layer is referred to as a surface section and another portion contacting the current collector plate as a current collector plate section,
a ratio (A2/A1) between an amount of the binder contained in the surface section (A2) and an amount of the binder contained in the current collector plate section (A1) being 1.0 to 1.2, and
the binder contained in the surface section having an average glass transition point Tgu lower than an average glass transition point Tgd of the binder contained in the current collector plate section,
wherein the method includes:
a first coating step of coating a first active material paste containing a first coating binder consisting of at least one of the plurality of binders and having an average glass transition point Tga, and the active material, on the current collector plate to form a first coated film of the first active material paste on the current collector plate,
a second coating step, after the first coating step, of coating a second active material paste containing a second coating binder consisting of at least another one of the plurality of binders and having an average glass transition point Tgb lower than the average glass transition point Tga of the first coating binder, and the active material, on the first coated film to form a second coated film of the second active material paste on the first coated film; and
a drying step, after the second coating step, of drying the first coated film and the second coated film simultaneously to form the active material layer from the first coated film and the second coated film.

10. The method for producing an electrode plate according to claim 9, wherein
the first active material paste and the second active material paste are prepared such that a weight concentration of the second coating binder in a solid content of the second active material paste is lower than a weight concentration of the first coating binder in a solid content of the first active material paste.

11. The method for producing an electrode plate according to claim 10,
wherein the active material layer includes, as the binder, a first binder and a second binder having a glass transition point Tg2 lower than a glass transition point Tg1 of the first binder,
the surface section contains more second binder than the first binder while the current collector plate section contains more first binder than the second binder, and
the first coating step uses the first active material paste containing the first binder, out of the first and second binders, as the first coating binder, and
the second coating step uses the second active material paste containing the second binder, out of the first and second binders, as the second coating binder.

12. The method for producing an electrode plate according to claim 11, wherein styrene-butadiene rubbers (SBR) having glass transition points Tg different from each other are used as the plurality of binders.

13. The method for producing an electrode plate according to claim 10, wherein styrene-butadiene rubbers (SBR) having glass transition points Tg different from each other are used as the plurality of binders.

14. The method for producing an electrode plate according to claim 9,
wherein the active material layer includes, as the binder, a first binder and a second binder having a glass transition point Tg2 lower than a glass transition point Tg1 of the first binder,
the surface section contains more second binder than the first binder while the current collector plate section contains more first binder than the second binder, and
the first coating step uses the first active material paste containing the first binder, out of the first and second binders, as the first coating binder, and
the second coating step uses the second active material paste containing the second binder, out of the first and second binders, as the second coating binder.

15. The method for producing an electrode plate according to claim 14, wherein styrene-butadiene rubbers (SBR) having glass transition points Tg different from each other are used as the plurality of binders.

16. The method for producing an electrode plate according to claim 9, wherein styrene-butadiene rubbers (SBR) having glass transition points Tg different from each other are used as the plurality of binders.

* * * * *